US008765303B2

(12) United States Patent
Chen et al.

(10) Patent No.: US 8,765,303 B2
(45) Date of Patent: Jul. 1, 2014

(54) LITHIUM-ION CELL HAVING A HIGH ENERGY DENSITY AND HIGH POWER DENSITY

(75) Inventors: Guorong Chen, Fairborn, OH (US); Aruna Zhamu, Centerville, OH (US); Xiging Wang, Cincinnati, OH (US); Bor Z. Jang, Centerville, OH (US); Yanbo Wang, Fairborn, OH (US); Qing Fang, Fairborn, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 228 days.

(21) Appl. No.: 13/506,168

(22) Filed: Apr. 2, 2012

(65) Prior Publication Data

US 2013/0260246 A1 Oct. 3, 2013

(51) Int. Cl.
*H01M 10/0525* (2010.01)
*H01M 4/133* (2010.01)

(52) U.S. Cl.
USPC ........................................................ 429/221

(58) Field of Classification Search
None
See application file for complete search history.

(56) References Cited

U.S. PATENT DOCUMENTS

| 2008/0113269 | A1* | 5/2008 | Yamamoto et al. | 429/231.4 |
| 2009/0092899 | A1* | 4/2009 | Treger | 429/188 |
| 2011/0070495 | A1* | 3/2011 | Ban et al. | 429/221 |
| 2013/0171502 | A1* | 7/2013 | Chen et al. | 429/149 |

OTHER PUBLICATIONS

U.S. Appl. No. 12/930,294, filed Jan. 3, 2011, A. Zhamu, et al.
U.S. Appl. No. 12/928,927, filed Dec. 23, 2010, A. Zhamu, et al.
U.S. Appl. No. 12/806,679, filed Aug. 9, 2010, C. G. Liu, et al.
U.S. Appl. No. 12/924,211, filed Sep. 23, 2010, C. G. Liu, et al.
U.S. Appl. No. 13/199,713, filed Sep. 7, 2011, A. Zhamu, et al.
U.S. Appl. No. 11/800,728, filed May 8, 2007, A. Zhamu, et al.
U.S. Appl. No. 13/374,321, filed Dec. 21, 2011, A. Zhamu, et al.
U.S. Appl. No. 13/374,894, filed Jan. 23, 2012, A. Zhamu, et al.
U.S. Appl. No. 13/385,561, filed Feb. 27, 2012, G. R. Chen, et al.
B. Z. Jang, et al. "Graphene Surface-Enabled Lithium Ion-Exchanging Cells: Next-Generation High-Power Energy Storage Devices," Nano Letters, 11 (2011) 3785-3791.

* cited by examiner

*Primary Examiner* — Patrick Ryan
*Assistant Examiner* — Wyatt McConnell

(57) ABSTRACT

A lithium-ion cell comprising: (A) a cathode comprising graphene as the cathode active material having a surface area to capture and store lithium thereon and wherein said graphene cathode is meso-porous having a specific surface area greater than 100 m$^2$/g; (B) an anode comprising an anode active material for inserting and extracting lithium, wherein the anode active material is mixed with a conductive additive and/or a resin binder to form a porous electrode structure, or coated onto a current collector in a coating or thin film form; (C) a porous separator disposed between the anode and the cathode; (D) a lithium-containing electrolyte in physical contact with the two electrodes; and (E) a lithium source disposed in at least one of the two electrodes when the cell is made. This new Li-ion cell exhibits an unprecedentedly high energy density.

25 Claims, 13 Drawing Sheets

LITHIUM-ION CELL HAVING A HIGH ENERGY DENSITY AND HIGH POWER DENSITY

The present invention is based on the research results of a project sponsored by the US DOE Vehicle Technology Program.

This application claims the benefits of the following co-pending application: Guorong Chen, Yanbo Wang, Qing Fang, Xiqing Wang, Aruna Zhamu, and Bor Z. Jang, "Lithium-ion Cell Having a High-Capacity Anode and a High-Capacity Cathode," U.S. patent application Ser. No. 13/385,561 (Feb. 27, 2012).

FIELD OF THE INVENTION

This invention relates generally to the field of lithium-ion battery and, more particularly, to a lithium-ion cell having a high-capacity anode and a meso-porous graphitic material-based high-capacity cathode.

BACKGROUND OF THE INVENTION

For over three decades, battery scientists have been frustrated with the low energy density of lithium-ion cells primarily due to the low lithium-storing capacity of all existing cathode active materials. Specifically, the practical specific capacity achievable with current cathode materials has been limited to the range of 150-250 mAh/g, mostly less than 200 mAh/g. Although several high-capacity anode active materials have been found (e.g., Si with a theoretical capacity of 4,200 mAh/g), there has been no corresponding high-capacity cathode material available.

Further, most of the commercially available Li-ion cells make use of carbon- or graphite-based anodes, which have several significant drawbacks: low specific capacity (theoretical capacity of only 372 mAh/g of graphite), slow Li intercalation (due to low solid-state diffusion coefficients of Li in graphite) resulting in a long recharge time, inability to deliver high pulse power, and necessity to use lithiated cathodes (e.g. lithium cobalt oxide), thereby limiting the choice of available cathode materials. Furthermore, these commonly used cathodes also rely upon extremely slow Li diffusion in the solid state. These factors have contributed to the two major shortcomings of today's Li-ion batteries—a low energy density (typically 120-180 $Wh/kg_{cell}$) and low power density (~0.5 $kW/kg_{cell}$).

Most recently, we proceeded to go beyond the mindset of using graphitic or carbonaceous materials either as an anode active material or as a cathode supporting material (i.e. as a conductive additive for the cathode). We have demonstrated the feasibility of implementing these materials as a cathode active material, responsible for storing lithium ions when the Li-ion cell is discharged to supply electricity to an external load. This is of great scientific and technological significance at least for two reasons. First, the commonly used cathode materials, such as lithium cobalt oxide and lithium iron phosphate, have relatively low specific capacities and, hence, a strong need exists for a higher-capacity cathode. Second, it is commonly understood in the battery industry and the field of electrochemistry that if a material is a good anode active material for a lithium-ion cell, the same material is usually not considered to be a viable cathode active material for a lithium-ion cell from the electrochemical potential perspective. We have defied this expectation with the discovery that a range of graphitic and carbonaceous materials can be used as a high-capacity and high-power cathode active material in a surface-mediated cell or SMC [Ref. 1-7 below].

The following list of references is herein cited as part of the background information:

1. C. G. Liu, et al., "Lithium Super-battery with a Functionalized Nano Graphene Cathode," U.S. patent application Ser. No. 12/806,679 (Aug. 19, 2010).
2. C. G. Liu, et al, "Lithium Super-battery with a Functionalized Disordered Carbon Cathode," U.S. patent application Ser. No. 12/924,211 (Sep. 23, 2010).
3. Aruna Zhamu, C. G. Liu, David Neff, and Bor Z. Jang, "Surface-Controlled Lithium Ion Exchanging Energy Storage Device," U.S. patent application Ser. No. 12/928,927 (Dec. 23, 2010).
4. Aruna Zhamu, C. G. Liu, David Neff, Z. Yu, and Bor Z. Jang, "Partially and Fully Surface-Enabled Metal Ion-Exchanging Battery Device," U.S. patent application Ser. No. 12/930,294 (Jan. 3, 2011).
5. Aruna Zhamu, Chen-guang Liu, X. Q. Wang, and Bor Z. Jang, "Surface-Mediated Lithium Ion-Exchanging Energy Storage Device," U.S. patent application Ser. No. 13/199,450 (Aug. 30, 2011).
6. Aruna Zhamu, Chen-guang Liu, and Bor Z. Jang, "Partially Surface-Mediated Lithium Ion-Exchanging Cells and Method of Operating Same," U.S. patent application Ser. No. 13/199,713 (Sep. 7, 2011).
7. Bor Z. Jang, C. G. Liu, D. Neff, Z. Yu, Ming C. Wang, W. Xiong, and A. Zhamu, "Graphene Surface-Enabled Lithium Ion-Exchanging Cells: Next-Generation High-Power Energy Storage Devices," Nano Letters, 2011, 11(9), pp 3785-3791.

There are two types of SMCs: partially surface-mediated cells (p-SMC, also referred to as lithium super-batteries) and fully surface-mediated cells (f-SMC). Both types of SMCs contain the following components: (a) an anode containing an anode current collector (such as copper foil) in a p-SMC, or an anode current collector plus an anode active material in an f-SMC; (b) a cathode containing a cathode current collector and a cathode active material (e.g. graphene or disordered carbon) having a high specific surface area; (c) a porous separator separating the anode and the cathode, soaked with an electrolyte (preferably liquid or gel electrolyte); and (d) a lithium source disposed in an anode or a cathode (or both) and in direct contact with the electrolyte.

In a fully surface-mediated cell, f-SMC, as illustrated in FIG. 2(A)-(C), both the cathode active material and the anode active material are porous, having large amounts of graphene surfaces in direct contact with liquid electrolyte. These electrolyte-wetted surfaces are ready to interact with nearby lithium ions dissolved therein, enabling fast and direct attachment of lithium ions onto graphene surfaces and/or a redox reaction between a lithium ion and a surface functional group, thereby removing the need for solid-state diffusion or intercalation. When the SMC cell is made, particles or foil of lithium metal are implemented at the anode (FIG. 2(A)), which are ionized during the first discharge cycle, supplying a large amount of lithium ions. These ions migrate to the nano-structured cathode through liquid electrolyte, entering the pores and reaching the surfaces in the interior of the cathode without having to undergo solid-state intercalation (FIG. 2(B)). When the cell is re-charged, a massive flux of lithium ions are quickly released from the large amounts of cathode surfaces, migrating into the anode zone. The large surface areas of the nano-structured anode enable concurrent and high-rate deposition of lithium ions (FIG. 2(C)), re-establishing an electrochemical potential difference between the lithium-decorated anode and the cathode.

In a p-SMC, the anode comprises a current collector and a lithium foil alone (as a lithium source), without an anode active material to capture and store lithium ions/atoms. Lithium has to deposit onto the front surface of an anode current collector alone (e.g. copper foil) when the battery is re-charged.

The features and advantages of SMCs that differentiate the SMC from conventional lithium-ion batteries (LIB), supercapacitors, and lithium-ion capacitors (LIC) are summarized below:

(A) In an SMC, lithium ions are exchanged between anode surfaces and cathode surfaces, instead of the bulk or interior of an electrode active material:

a. The conventional LIB stores lithium in the interior of an anode active material (e.g. graphite particles) when the LIB is in a charged state (e.g. FIG. 1(C)) and the interior of a cathode active material in a discharged state (FIG. 1(D)). During the discharge and charge cycles of a LIB, lithium ions must diffuse into and out of the bulk of a cathode active material, such as lithium cobalt oxide ($LiCoO_2$) and lithium iron phosphate ($LiFePO_4$). Lithium ions must also diffuse in and out of the inter-planar spaces in a graphite crystal serving as an anode active material. The lithium insertion or extraction procedures at both the cathode and the anode are very slow, resulting in a low power density and requiring a long re-charge time.

b. When in a charged state, a symmetric supercapacitor (EDLC) stores their cations near a surface (but not at the surface) of an anode active material (e.g. activated carbon, AC) and stores their counter-ions near a surface (but not at the surface) of a cathode active material (e.g., AC), as illustrated in FIG. 1(A). When the EDLC is discharged, both the cations and their counter-ions are re-dispersed randomly in the liquid electrolyte, further away from the AC surfaces (FIG. 1(B)). In other words, neither the cations nor the anions are exchanged between the anode surface and the cathode surface.

c. When in a charged state, a LIC also stores lithium in the interior of graphite anode particles (FIG. 1(E)) or $Li_4Ti_5O_{12}$ particles (FIG. 1(F)), thus requiring a long re-charge time as well. During discharge, lithium ions must also diffuse out of the interior of graphite particles, thereby compromising the power density. The lithium ions (cations $Li^+$) and their counter-ions (e.g. anions $PF_6^-$) are randomly dispersed in the liquid electrolyte when the LIC is in a discharged state (FIG. 1(F)). In contrast, the lithium ions are captured by graphene surfaces (e.g. at centers of benzene rings of a graphene sheet) when an SMC is in a discharged state. Lithium is deposited on the surface of an anode (anode current collector and/or anode active material) when the SMC is in a charged state. Relatively few lithium ions stay in the liquid electrolyte.

d. For a supercapacitor exhibiting a pseudo-capacitance or redox effect, either the cation or the anion form a redox pair with an electrode active material (e.g. polyanniline or manganese oxide coated on AC surfaces) when the supercapacitor is in a charged state. However, when the supercapacitor is discharged, both the cations and their counter-ions are re-dispersed randomly in the liquid electrolyte, away from the AC surfaces. Neither the cations nor the anions are exchanged between the anode surface and the cathode surface. In contrast, in a SMC, the cations ($Li^+$) are captured by cathode surfaces (e.g. graphene benzene ring centers) when the SMC is in the discharged state. It is also the cations ($Li^+$) that are captured by surfaces of an anode current collector and/or anode active material) when the SMC is in the discharged state. In other words, the lithium ions are shuttled between the anode surfaces and the cathode surfaces.

e. An SMC operates on the exchange of lithium ions between the surfaces of an anode (anode current collector and/or anode active material) and a cathode (cathode active material). The cathode in a SMC has (a) benzene ring centers on a graphene plane to capture and release lithium; (b) functional groups (e.g. attached at the edge or basal plane surfaces of a graphene sheet) that readily and reversibly form a redox reaction with a lithium ion from a lithium-containing electrolyte; and (c) surface defects to trap and release lithium during discharge and charge. Unless the cathode active material (e.g. graphene, CNT, or disordered carbon) is heavily functionalized, mechanism (b) does not significantly contribute to the lithium storage capacity.

When the SMC is discharged, lithium ions are released from the surfaces of an anode (surfaces of an anode current collector and/or surfaces of an anode active material, such as graphene). These lithium ions do not get randomly dispersed in the electrolyte. Instead, these lithium ions swim through liquid electrolyte and get captured by the surfaces of a cathode active material. These lithium ions are stored at the benzene ring centers, trapped at surface defects, or captured by surface/edge-borne functional groups. Very few lithium ions remain in the liquid electrolyte phase.

When the SMC is re-charged, massive lithium ions are released from the surfaces of a cathode active material having a high specific surface area. Under the influence of an electric field generated by an outside battery charger, lithium ions are driven to swim through liquid electrolyte and get captured by anode surfaces, or are simply electrochemically plated onto anode surfaces.

(B) In a discharged state of a SMC, a great amount of lithium atoms are captured on the massive surfaces of a cathode active material. These lithium ions in a discharged SMC are not dispersed or dissolved in the liquid electrolyte, and are not part of the electrolyte. Therefore, the solubility limit of lithium ions and/or their counter-ions does not become a limiting factor for the amount of lithium that can be captured at the cathode side. It is the specific surface area at the cathode that dictates the lithium storage capacity of an SMC provided there is a correspondingly large amount of available lithium atoms at the lithium source prior to the first discharge/charge.

(C) During the discharge of an SMC, lithium ions coming from the anode side through a separator only have to diffuse in the liquid electrolyte residing in the cathode to reach a surface/edge of a graphene plane. These lithium ions do not need to diffuse into or out of the volume (interior) of a solid particle. Since no diffusion-limited intercalation is involved at the cathode, this process is fast and can occur in seconds. Hence, this is a totally new class of energy storage device that exhibits unparalleled and unprecedented combined performance of an exceptional power density, high energy density, long and stable cycle life, and wide operating temperature range. This device has exceeded the best of both battery and supercapacitor worlds.

(D) In an f-SMC, the energy storage device operates on lithium ion exchange between the cathode and the anode. Both the cathode and the anode (not just the cathode) have a lithium-capturing or lithium-storing surface and both electrodes (not just the cathode) obviate the need to engage in solid-state diffusion. Both the anode and the cathode have large amounts of surface areas to allow lithium ions to deposit thereon simultaneously, enabling dramatically higher charge and discharge rates and higher power densities.

The uniform dispersion of these surfaces of a nano-structured material (e.g. graphene, CNT, disordered carbon, nano-wire, and nano-fiber) at the anode also provides a more uniform electric field in the electrode in which lithium can more uniformly deposit without forming a dendrite. Such a nano-structure eliminates the potential formation of dendrites, which was the most serious problem in conventional lithium metal batteries (commonly used in 1980s and early 1990s before being replaced by lithium-ion batteries).

(E) A SMC typically has an open-circuit voltage of >1.0 volts (most typically >1.5 volts) and can operate up to 4.5 volts for lithium salt-based organic electrolyte. Using an identical electrolyte, a corresponding EDLC or symmetric supercapacitor has an open-circuit voltage of essentially 0 volts and can only operate up to 2.7 volts. Also using an identical electrolyte, a LIC operates between 2.2 volts and 3.8 volts. These are additional manifestations of the notion that the SMC is fundamentally different and patently distinct from both the EDLC and the LIC.

The amount of lithium stored in the lithium source when a SMC is made dictates the amount of lithium ions that can be exchanged between an anode and a cathode. This, in turn, dictates the energy density of the SMC.

In these co-pending patent applications [Ref. 1-6] we used graphene or disordered carbon as a cathode active material for a SMC cell, wherein the anode contains only a current collector or a current collector and an anode active material having high surfaces on which lithium can be electrochemically deposited. The anode active material (e.g. graphene) in a SMC does not involve lithium intercalation and de-intercalation.

In a co-pending application (G. Chen, et al, U.S. application Ser. No. 13/385,561 (Feb. 27, 2012)), isolated graphene sheets are used as a cathode active material for a lithium-ion cell (not SMC). In the instant application, an array of meso-porous graphitic materials (not including isolated graphene sheets) is used as the cathode active material. In both co-pending applications, the Li-ion cell contains a high-capacity anode active material (e.g. Si, Sn, or $SnO_2$) and/or a high-rate capable anode active material (e.g. nano-scaled $Mn_3O_4$ particles). These anode active materials (e.g. Si, Sn, $SnO_2$, and $Mn_3O_4$) in the lithium-ion cells operate on lithium intercalation and de-intercalation. These combinations lead to several unexpected yet highly significant results. Experimental evidence indicates that the electrochemical behaviors of these Li-ion cells and the SMC cells are vastly different and fundamentally distinct.

In summary, the current cathode active materials commonly used in Li-ion batteries have the following serious drawbacks:

(1) The practical capacity achievable with current cathode materials (e.g. lithium iron phosphate and lithium transition metal oxides) has been limited to the range of 150-250 mAh/g and, in most cases, less than 200 mAh/g.

(2) The production of these cathode active materials normally has to go through a high-temperature sintering procedure for a long duration of time, a tedious, energy-intensive, and difficult-to-control process.

(3) The insertion and extraction of lithium in and out of these commonly used cathodes rely upon extremely slow solid-state diffusion of Li in solid particles having very low diffusion coefficients (typically $10^{-8}$ to $10^{-14}$ $cm^2/s$), leading to a very low power density (another long-standing problem of today's lithium-ion batteries).

(4) The current cathode materials are electrically and thermally insulating, not capable of effectively and efficiently transporting electrons and heat. The low electrical conductivity means high internal resistance and the necessity to add a large amount of conductive additives, effectively reducing the proportion of electrochemically active material in the cathode that already has a low capacity. The low thermal conductivity also implies a higher tendency to undergo thermal runaway, a major safety issue in lithium battery industry.

(5) The most commonly used cathodes, including lithium transition metal oxides and lithium iron phosphate, contain a high oxygen content that could assist in accelerating the thermal runaway and provide oxygen for electrolyte oxidation, increasing the danger of explosion or fire hazard. This is a serious problem that has hampered the widespread implementation of electric vehicles.

Thus, it is an object of the present invention to provide a high-capacity cathode active material (preferably with a specific capacity greater than 250 mAh/g) for use in a lithium ion cell.

It is another object of the present invention to provide a high-capacity cathode active material exhibiting a specific capacity greater than 350 mAh/g or even greater than 500 mAh/g.

It is still another object of the present invention to provide a high-capacity cathode active material (with a specific capacity greater than 250 mAh/g) that can be readily prepared without going through an energy-intensive sintering process.

Another object of the present invention is to provide a high-capacity cathode active material (with a specific capacity greater than 250 mAh/g) that is amenable to being lithium intercalation-free or fast lithium intercalation, leading to a significantly improved power density.

Yet another object of the present invention is to provide a high-capacity cathode active material that is electrically and thermally conductive, enabling high-rate capability and effective heat dissipation.

It is still another object of the present invention to provide a high-capacity cathode active material that contains little or no oxygen, reducing or eliminating the potential fire hazard or explosion.

It is an ultimate object of the present invention to provide a high energy density lithium-ion cell that features a high-capacity cathode active material described above.

SUMMARY OF THE INVENTION

In one preferred embodiment, the present invention provides a lithium-ion cell comprising:
(a) a positive electrode (cathode) comprising a meso-porous carbon or graphitic material selected from graphite worms, exfoliated graphite flakes, expanded graphite, chemically treated graphite with an inter-graphene planar separation no less than 0.4 nm, chemically etched or expanded soft carbon, chemically etched or expanded hard carbon, exfoliated activated carbon, chemically etched or expanded carbon black, chemically expanded multi-walled carbon nano-tube, chemically expanded carbon nano-fiber, or a combination thereof as the only cathode active material having a surface area to capture and store lithium thereon and wherein the cathode forms a meso-porous structure having a pore in the size range of 2 nm to 50 nm and having a specific surface area greater than 50 m$^2$/g (preferably greater than 100 m$^2$/g, more preferably greater than 500 m$^2$/g, further preferably greater than 1,000 m$^2$/g, and most preferably greater than 1,500 m$^2$/g);

(b) a negative electrode (anode) comprising an anode active material having a lithium storing capacity no less than 400 mAh/g, wherein the anode active material is mixed with a conductive additive and a resin binder to form a porous electrode structure, or coated onto a current collector in a coating or thin film form (e.g. <300 μm, preferably <200 μm), and wherein the anode active material is not pre-lithiated and is lithium-free when the cell is made;

(c) a porous separator disposed between the anode and the cathode;

(d) a lithium-containing electrolyte in physical contact with the two electrodes; and (e) a lithium source disposed in at least one of the two electrodes when the cell is made. The exfoliated graphite flakes or expanded graphite flakes have a flake thickness greater than 100 nm.

In a highly desired embodiment, the cathode contains a conductive additive and/or a resin binder and the cathode forms a meso-porous structure having a pore size in the range of 2 nm and 50 nm. In particular, the cathode contains a conductive filler selected from graphite or carbon particles, carbon black, expanded graphite, carbon nanotube, carbon nano-fiber, carbon fiber, conductive polymer, or a combination thereof. The materials in this list are commonly used as a conductive additive, not as a cathode active material, in lithium-ion batteries. The cathode does not contain any cathode active material other than the specified meso-porous graphitic material; no lithium transition metal oxide, no transition metal phosphate, etc.

For the purpose of defining the scope of the claims, the cathode in the instant application does not contain a sulfur cathode. The sulfur cathode relies on very slow and often irreversible chemical reactions between Li and S and there are several intermediate Li$_x$S compounds that can get dissolved in electrolyte. The lithium-ion cell herein defined does not include a Li—S cell or Li-air cell. The graphitic material (selected from graphite worms, exfoliated graphite flakes, soft carbon, hard carbon, activated carbon, etc) is the only cathode active material used in the presently invented Li-ion cell.

The lithium source comprises a lithium chip, lithium alloy chip, lithium foil (FIG. 3(A)), lithium alloy foil, lithium powder (FIG. 3(B)), lithium alloy powder, surface stabilized lithium particles, a mixture of lithium metal or lithium alloy with a lithium intercalation compound, lithium or lithium alloy film coated on a surface of an anode or cathode active material, or a combination thereof. The anode active material, in both FIGS. 3(A) and FIG. 3(B), can be a prelithiated material or a non-lithiated material. Although not shown, a resin binder and a conductive additive are preferably used to bind the anode active material together to form an electrode of structural integrity and to help maintain an electric contact between the anode and the anode current collector. The lithium source (e.g., lithium powder) is normally not adhered to the current collector with a resin binder.

In a preferred embodiment of the present invention, the anode active material is a non-prelithiated material. Preferably, the anode active material contains a mixture of a high capacity anode material and a high rate capable anode material, wherein the high rate capable anode material is selected from nano-scaled particles or filaments of a transition metal oxide, $Co_3O_4$, $Mn_3O_4$, $Fe_3O_4$, or a combination thereof, and the high capacity anode material is selected from Si, Ge, Sn, SnO, or a combination thereof. Nano-scaled particles or filaments have a dimension (e.g. diameter or thickness) less than 100 nm, enabling a short lithium diffusion time and high power density. In particular, the anode active material is a non-prelithiated material selected from the group consisting of: (a) Non-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Non-lithiated alloys or intermetallic compounds of Si, Ge, Sn, Pb, Sb, Bi, Zn, Al, Ti, Co, Ni, Mn, Cd, and their mixtures; (c) Non-lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Non-lithiated salts or hydroxides of Sn; and (e) graphite or carbon material in a powder or fibrous form. A non-prelithiated anode active material is sufficient since there is a separate lithium source incorporated in this lithium-ion cell.

In a preferred embodiment, the aforementioned non-lithiated anode active material is in the form of a nano particle, nano disc, nano platelete, nano wire, nano-rod, nano belt, nano scroll, nano tube, nano filament, nano coating, or nano film.

Another preferred embodiment of the present invention is a lithium-ion cell comprising: (A) a positive electrode (cathode) comprising a graphitic or carbonaceous material (selected from graphite worms, exfoliated graphite flakes, expanded graphite, chemically treated graphite with an intergraphene planar separation no less than 0.4 nm (e.g., via intercalation and/or oxidation), chemically etched or expanded soft carbon, chemically etched or expanded hard carbon, exfoliated activated carbon, chemically etched or expanded carbon black, chemically expanded multi-walled carbon nano-tube, chemically expanded carbon nano-fiber, or a combination thereof) as a cathode active material having a surface area to capture and store lithium thereon and wherein the cathode is meso-porous having a pore size in the range of 2-50 nm and a specific surface area greater than 50 m$^2$/g; (B) A negative electrode (anode) comprising a prelithiated anode active material for inserting and extracting lithium during a charge and discharge of the cell, wherein the anode active material is a nano particle, nano disc, nano platelete, nano wire, nano-rod, nano belt, nano scroll, nano tube, nano filament, nano coating, or nano film selected from: (a) a prelithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), or a mixture thereof; (b) a pre-lithiated alloy or intermetallic compound of Si, Ge, Sn, Pb, Sb, Bi, Zn, Al, Ti, Co, Ni, Mn, Cd, or a mixture thereof; (c) a pre-lithiated oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof, or (d) a prelithiated salt or hydroxide of Sn; and wherein said anode active material is electrically connected directly to an anode current collector or is connected to an anode current collector through a binder and/or a conductive additive; (C) a porous separator disposed between the anode and the cathode; and (D) a lithium-containing electrolyte in physical contact with the anode and the cathode. Since a prelithiated anode active material is implemented, an additional lithium source is not needed.

It may be noted that, in some of our SMC cells disclosed recently [e.g. Ref. 3, 5, 6], a prelithiated compound was suggested as a possible lithium source, but this compound was not used as an anode active material and the cathode active material was graphene (not the graphitic material herein specified). This prelithiated compound (e.g. shown in FIG. 2(A)) in a SMC was dispersed near the anode to emit lithium ions into electrolyte so that these released lithium ions could be shuttled between anode surfaces and cathode surfaces. This lithiated compound was not electrically connected to an anode current collector (directly or through a resin binder and/or a conductive additive) after the first discharge cycle. This lithiated compound was not glued together with a resin to form an electrode of structural integrity; but, instead, was simply dispersed near the anode for supplying lithium during the first cycle. Further, this lithiated compound was not a nano particle, nano disc, nano platelete, nano wire, nanorod, nano belt, nano scroll, nano tube, nano filament, nano coating, or nano film as herein specified.

In a further preferred embodiment, the anode active material contains a mixture of a high capacity anode material and a high rate capable anode material, wherein the high rate capable anode material is selected from nano-scaled particles or filaments of a lithium transition metal oxide, $Co_3O_4$, $Mn_3O_4$, $Fe_3O_4$, $Li_4Ti_5O_{12}$, or a combination thereof, and the high capacity anode material is selected from pre-lithiated Si, Ge, Sn, SnO, or a combination thereof. The high-rate capable material (e.g. $Li_4Ti_5O_{12}$) is not used alone in the presently invented Li-ion cell since $Li_4Ti_5O_{12}$ is not a high-capacity anode (having a specific capacity of only 150 mAh/g, even lower than that of graphite).

Preferably, the anode active material is prelithiated to an initial specific capacity of no less than 500 mAh/g (more preferably no less than 1,000 mAh/g, even more preferably no less than 2,000 mAh/g, and most preferably no less than 3,000 mAh/g) based on the anode active material weight. Preferably, when the lithium-ion cell containing such a prelithiated anode active material is discharged, the anode active material remains not fully discharged; preferably, the anode active material maintains at least 50% of the initial specific capacity.

Yet another preferred embodiment of the present invention is a lithium-ion cell comprising: (A) A positive electrode (cathode) comprising a graphitic or carbonaceous material (selected from graphite worms, exfoliated graphite flakes, soft carbon, hard carbon, activated carbon, or a combination thereof) as a cathode active material having a surface area to capture and store lithium thereon and wherein said cathode is meso-porous having a specific surface area greater than 50 $m^2/g$; (B) A negative electrode (anode) comprising an anode active material for inserting and extracting lithium during a charge and discharge of the cell, wherein the anode active material is mixed with a conductive filler and a binder to form a porous electrode and the anode active material is selected from: (a) a pre-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), or a mixture thereof; (b) a pre-lithiated alloy or intermetallic compound of Si, Ge, Sn, Pb, Sb, Bi, Zn, Al, Ti, Co, Ni, Mn, Cd, or a mixture thereof; (c) a pre-lithiated oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof, or (d) a pre-lithiated salt or hydroxide of Sn; (C) a porous separator disposed between the anode and the cathode; and (D) a lithium-containing electrolyte in physical contact with the two electrodes. This lithium-ion cell preferably further contains a lithium source disposed in at least one of the two electrodes when the cell is made, wherein the lithium source comprises a lithium chip, lithium alloy chip, lithium foil, lithium alloy foil, lithium powder, lithium alloy powder, surface stabilized lithium particles, a mixture of lithium metal or lithium alloy with a lithium intercalation compound, lithium or lithium alloy film coated on a surface of an anode or cathode active material, or a combination thereof.

The lithium-ion cell of the present invention may advantageously further comprise an anode current collector and/or a cathode current collector that is a porous, electrically conductive material selected from metal foam, metal web or screen, perforated metal sheet, metal fiber mat, metal nanowire mat, porous conductive polymer film, conductive polymer nanofiber mat or paper, conductive polymer foam, carbon foam, carbon aerogel, carbon xerox gel, graphene foam, graphene oxide foam, reduced graphene oxide foam, carbon fiber paper, graphene paper, graphene oxide paper, reduced graphene oxide paper, carbon nano-fiber paper, carbon nanotube paper, or a combination thereof.

In one embodiment, the lithium-ion cell may have a discharge operation that involves both lithium intercalation into an interior of the cathode active material and lithium capturing on active surfaces of the cathode active material.

The electrolyte is preferably organic liquid electrolyte, ionic liquid electrolyte, or gel electrolyte containing a first amount of lithium ions when the cell is made. The electrolyte preferably comprises lithium salt-containing liquid electrolyte (e.g. organic liquid or ionic liquid) or gel electrolyte in which lithium ions have a high diffusion coefficient. Solid electrolyte is normally not desirable, but some thin layer of solid electrolyte may be used if it exhibits a relatively high diffusion rate. Lithium-containing ionic liquids are particularly desired due to their low volatility and non-flammability (hence, low or no fire or explosion hazard).

The lithium source may be preferably in a form of solid lithium or lithium alloy foil, lithium or lithium alloy chip, lithium or lithium alloy powder, or surface-stabilized lithium particles. The lithium source may be a layer of lithium or lithium alloy thin film pre-loaded on surfaces of an anode active material. In one preferred embodiment, the cell operates between a lower voltage limit and an upper voltage limit wherein the lithium source provides an amount of lithium sufficient for the anode to retain a non-zero lithium content when the cell is discharged to the lower voltage limit.

To illustrate the operational principle of this new ultra high-capacity battery (FIG. 4(A)), one may consider a case wherein a lithium source (e.g. small pieces of lithium foil) is implemented between a nano-structured anode (e.g. comprising nano Si particles and conductive additives bonded together by a resin) and a porous polymer separator when the battery device is made, and wherein a nano-structured cathode comprises graphite worms having surface areas capable of capturing and storing lithium thereon. The graphite worms contain pores that are preferably meso-scaled (2 nm-50 nm), but can be smaller than 2 nm. Referring to FIG. 4(A)-(C), during the first discharge cycle, lithium foil is ionized to generate lithium ions in the liquid electrolyte. Lithium ions rapidly migrate through the pores of the polymer separator into the cathode side. Since the cathode is also meso-porous having interconnected pores to accommodate liquid electrolyte therein, lithium ions basically just have to sail through liquid to reach an active site on a surface or edge of a graphite flake at the cathode. The graphite flake surface is in direct contact with electrolyte and readily accepts lithium ions from the electrolyte. Because all the steps (lithium ionization, liquid phase diffusion, and surface trapping/capturing) are fast and no solid-state diffusion is required, the whole process is very fast, enabling fast discharging of the cell and a high power density.

In the above example, the discharge process continues until either the lithium foil is completely ionized or all the active sites on the cathode active materials are occupied by lithium atoms. During re-charge, lithium ions are released from the surfaces of the cathode active material, diffuse through liquid electrolyte, and intercalate into the bulk of an anode active material (e.g. Si particles). This intercalation step involves solid-state diffusion and hence, can be very slow, as compared to the SMC cells invented earlier by us. However, we have found that the solid-state diffusion time can be significantly reduced if the anode active material is made into a nano-scaled structure; e.g. in the form of a nano particle, nano disc, nano platelete, nano wire, nano-rod, nano belt, nano scroll, nano tube, nano filament, nano coating, or nano film.

The surfaces of a graphitic cathode material are capable of capturing lithium ions directly from a liquid electrolyte phase and storing lithium atoms on the surfaces in a reversible and stable manner. This is a completely new electrochemistry that has never been discovered by anybody other than our research group. All other research groups have selected graphitic or carbonaceous materials for use as an anode active material (instead of a cathode active material) in a lithium ion cell.

During the discharge process, lithium ions are released from the anode, and the graphitic material surfaces at the cathode continue to absorb lithium ions from the liquid electrolyte and store lithium on graphitic material surfaces or interior, maintaining a low lithium ion content in the liquid electrolyte, lower than or equal to the lithium ion solubility limit in the liquid. This process continues until graphitic material active surface sites at the cathode are saturated with lithium. This saturation limit can be many times greater than the lithium ion solubility limit in the liquid electrolyte provided the specific surface area of the cathode active material is sufficiently high (e.g. higher than 50 $m^2/g$). Such a high lithium amount on cathode surfaces implies a high energy density.

The cathode active material has a high specific surface area (>50 $m^2/g$) that is in direct contact with the electrolyte (e.g. being directly immersed in electrolyte) and surprisingly capable of capturing lithium ions from the electrolyte and storing the lithium atoms in the surface active sites. Preferably, the cathode as an electrode forms a meso-porous structure having a pore size in the range of 2 nm and 50 nm, enabling easy entry of liquid electrolyte into the porous interior of a graphitic material particle and exposing surface active sites to Li ion-containing electrolyte. Preferably, the cathode has a specific surface area no less than 500 $m^2/gram$ (preferably >1,000 $m^2/gram$, and more preferably >1,500 $m^2/gram$) to store or support lithium ions or atoms thereon.

DESCRIPTION OF THE PREFERRED EMBODIMENTS

Figure 1A:
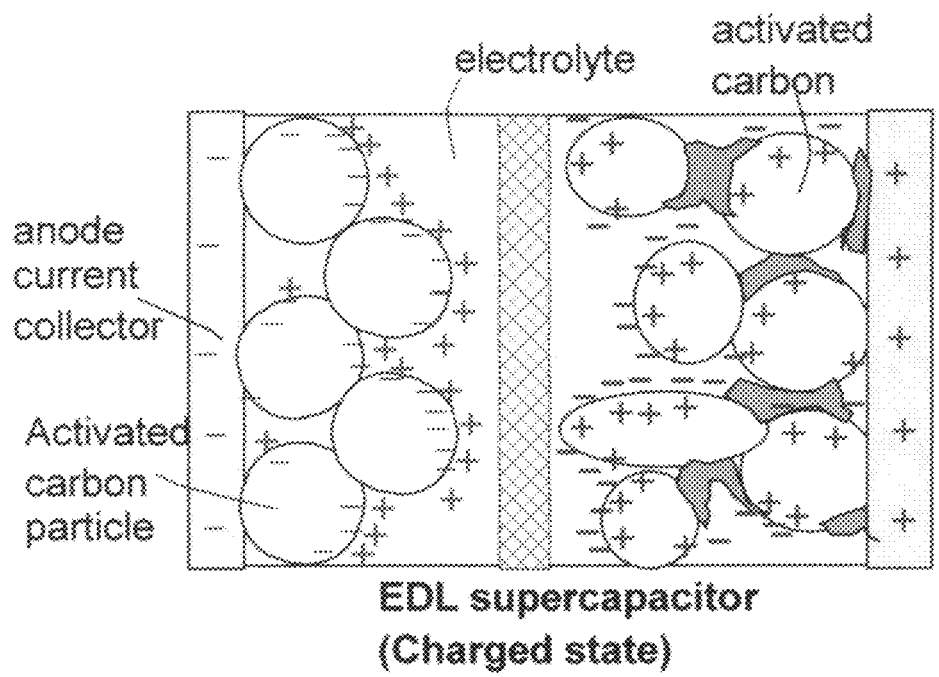
FIG. 1 (A) a prior art electric double-layer (EDL) supercapacitor in the charged state; (B) the same EDL supercapacitor in the discharged state; (C) a prior art lithium-ion battery (LIB) cell in the charged state; (D) the same LIB in the discharged state; (E) a prior art lithium-ion capacitor (LIC) cell in the charged state, using graphite particles as the anode active material and activated carbon (AC) as the cathode active material; (F) the same LIC in the discharged state; (G) another prior art LIC using lithium titanate as the anode active material and AC or CNF as the cathode active material.
Figure 1B:
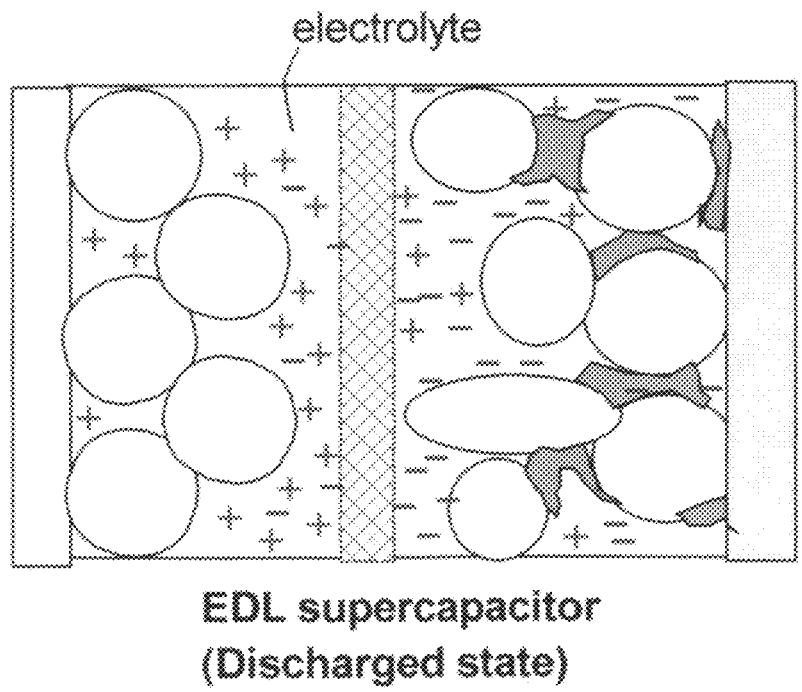
Figure 1C:
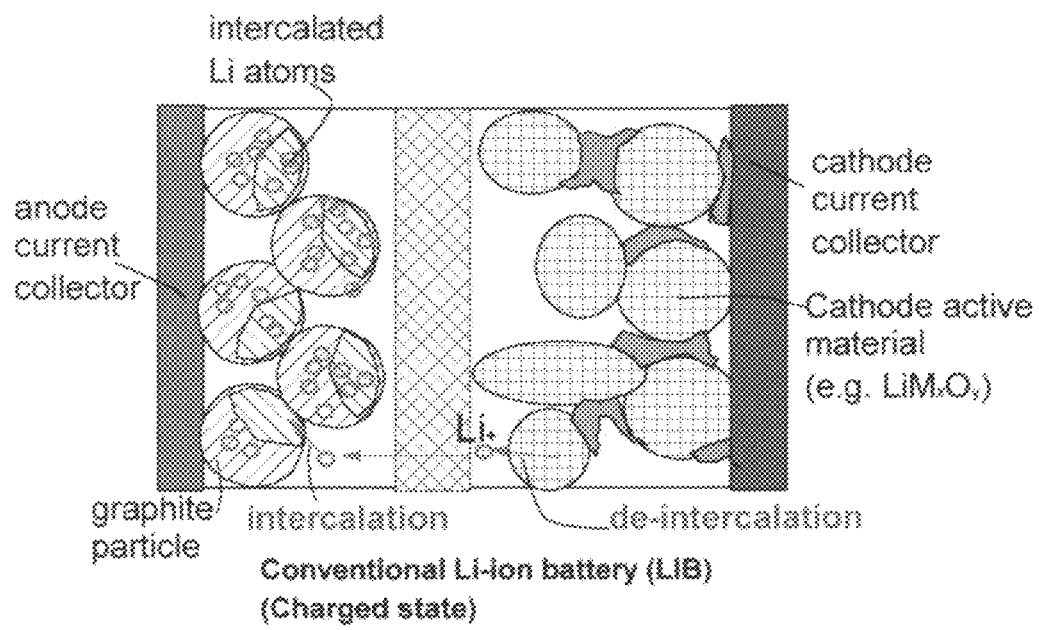
Figure 1D:
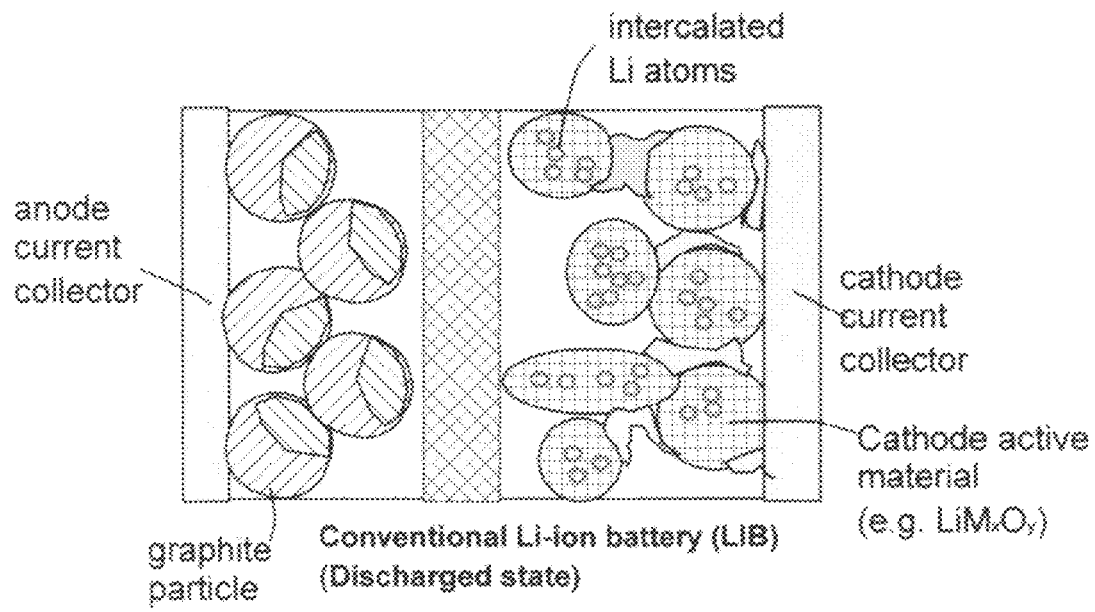
Figure 1E:
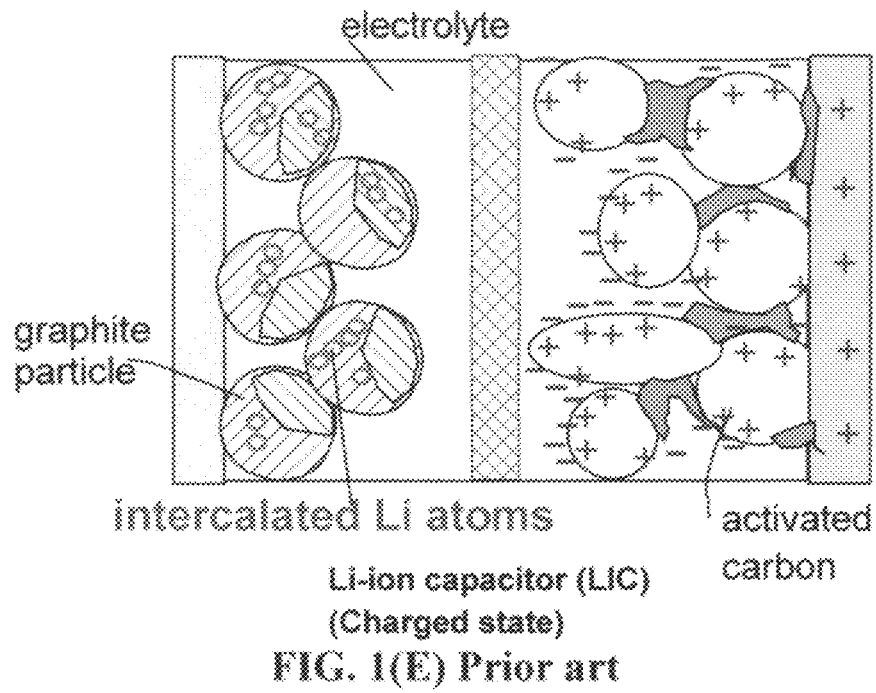
Figure 1F:
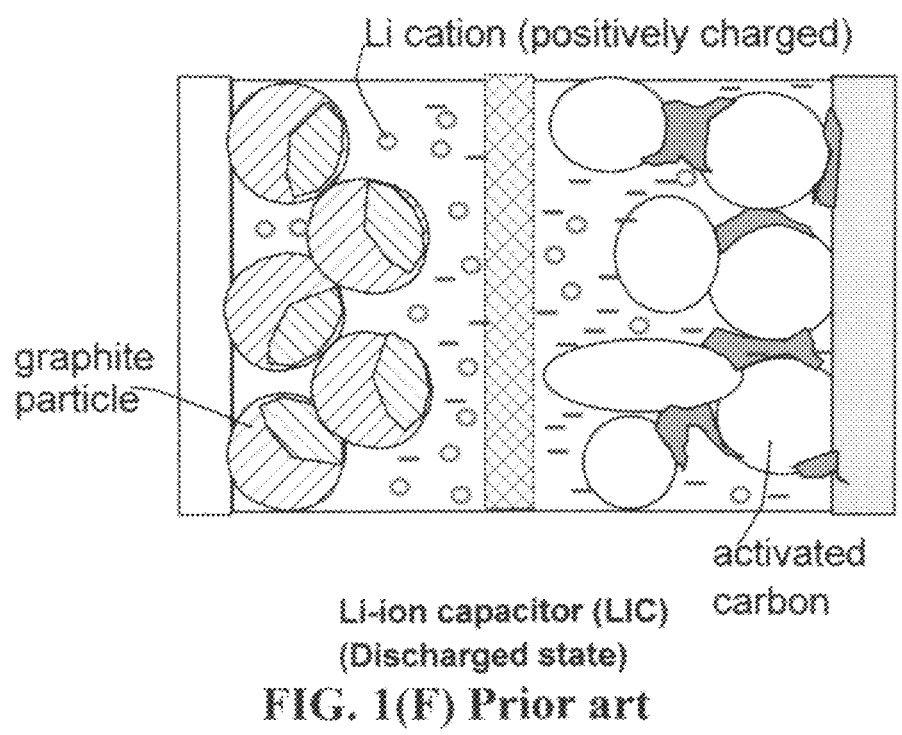
Figure 1G:
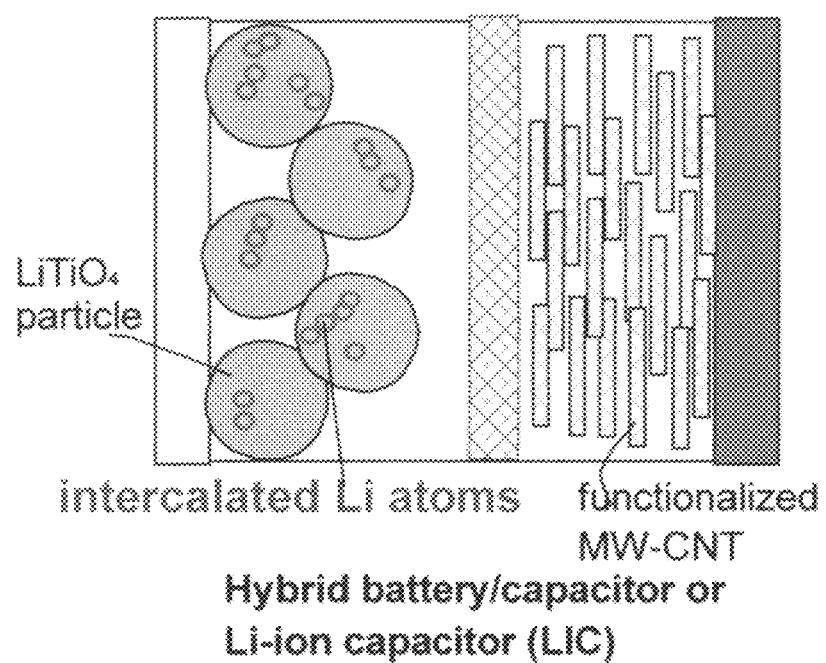

The present invention may be more readily understood by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting the claimed invention.

This invention provides a new and distinct type of lithium-ion cell, which exhibits the highest energy density of all rechargeable lithium-ion batteries ever reported in battery industry.

This cell contains a meso-porous graphitic or carbonaceous material-based positive electrode (cathode) containing active surfaces for capturing and storing lithium atoms thereon. The graphitic material may be selected from graphite worms, exfoliated graphite flakes, expanded graphite, chemically treated graphite with an inter-graphene planar separation no less than 0.4 nm (preferably greater than 0.5 nm, more preferably greater than 0.6 nm), soft carbon (preferably, chemically etched or expanded soft carbon), hard carbon (preferably, chemically etched or expanded hard carbon), activated carbon (preferably, exfoliated activated carbon), carbon black (preferably, chemically etched or expanded carbon black), chemically expanded multi-walled carbon nanotube, chemically expanded carbon nano-fiber, or a combination thereof. The graphitic material optionally may also have the capability to store some lithium in the bulk (interior) of graphitic material particles.

The cathode, as an electrode, is preferably nano-structured with a desired amount of meso-scaled pores (2-50 nm, preferably 2-10 nm) to allow the entry of electrolyte. This is advantageous because these pores enable a great amount of surface areas to be in physical contact with electrolyte and capable of capturing lithium from the electrolyte. These surface areas are typically and preferably >50 m$^2$/g, more preferably >500 m$^2$/g, further more preferably >1,000 m$^2$/g, and most preferably >1,500 m$^2$/g.

It may be noted that graphite crystals in a graphitic or carbonaceous material contain graphene planes having an inter-graphene plane spacing of approximately 0.34 nm. We have experimentally observed that, by oxidizing or fluorinating the graphite crystals one can increase the inter-graphene spacing to >0.40 nm, more typically >0.50 nm, and most typically >0.60 nm. We have further observed that these expanded graphite crystals with extra spaces between graphene planes can accommodate great amounts of lithium atoms when used as a cathode active material.

The presently invented cell also contains a negative electrode (anode) comprising an anode active material for inserting and extracting lithium during the charge and discharge of the cell, wherein the anode active material is mixed with a conductive additive and/or a resin binder to form a porous electrode structure, or coated onto a current collector in a coating or thin film form (e.g. film thickness <100 μm). The anode active material preferably has a lithium storage capacity greater than 400 mAh/g. The anode active material is preferably nano-scaled material having a dimension less than 100 nm, preferably less than 20 nm.

The Li-ion cell further contains a porous separator disposed between the anode and the cathode; a lithium-containing electrolyte in physical contact with the two electrodes (the anode and the cathode); and a lithium source disposed in at least one of the two electrodes when the cell is made. In one preferred embodiment, the anode active material is not prelithiated and is lithium-free when the cell is made.

Several types of lithium sources may be implemented to provide the lithium ions that are needed for shuttling between the anode and the cathode. Examples of the sources are a lithium chip, lithium alloy chip, lithium foil, lithium alloy foil, lithium powder, lithium alloy powder, surface stabilized lithium particles, a mixture of lithium metal or lithium alloy with a lithium intercalation compound, lithium or lithium alloy film coated on a surface of an anode or cathode active material, or a combination thereof.

In this preferred embodiment of the present invention, the anode active material is not prelithiated since there is a lithium source already. In particular, the anode active material is a non-prelithiated material selected from the group consisting of: (a) Non-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Non-lithiated alloys or intermetallic compounds of Si, Ge, Sn, Pb, Sb, Bi, Zn, Al, Ti, Co, Ni, Mn, Cd, and their mixtures; (c) Non-lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Non-lithiated salts or hydroxides of Sn; and (e) graphite or carbon material in a powder or fibrous form. Unless the anode active material is directly coated onto a current collector, the anode active material is typically mixed with a conductive additive and/or a resin binder to form a porous electrode structure that is electrically connected to the anode current collector.

During the first discharge cycle of the cell after it is made, the lithium source releases lithium ions into the electrolyte. These lithium ions migrate through the porous separator into the cathode and get captured by the cathode, via surface-capturing of Li and Li intercalation. During the subsequent re-charge of the cell, lithium ions are released from cathode and migrate back to the anode side. These lithium ions then intercalate into the interior of anode active material particles or coating. The subsequent discharge cycle involves releasing lithium ions from the anode active material through de-intercalation. In a preferred embodiment, the aforementioned non-lithiated anode active material is in the form of a nano particle, nano disc, nano platelet, nano wire, nano-rod, nano belt, nano scroll, nano tube, nano filament, nano coating, or nano film, having a dimension less than 100 nm, preferably less than 20 nm.

Preferably, the anode active material contains a mixture of a high capacity anode material and a high rate capable anode material, wherein the high rate capable anode material is selected from nano-scaled particles or filaments of a transition metal oxide, $Co_3O_4$, $Mn_3O_4$, $Fe_3O_4$, or a combination thereof, and the high capacity anode material is selected from Si, Ge, Sn, SnO, or a combination thereof. Nano-scaled particles or filaments have a dimension (e.g. diameter or thickness) less than 100 nm, enabling a short lithium diffusion time and high power density.

It has been commonly believed that a high specific surface area is an undesirable feature of either an anode or a cathode for a lithium-ion cell based on the belief that a higher surface area leads to the formation of more solid-electrolyte interface (SEI), a common cause of capacity irreversibility or capacity loss. We have herein defied this expectation and discovered that the meso-porous graphitic cathode materials can be superior cathode materials for lithium-ion cells, which could operate thousands of cycles without any significant capacity decay. This is so in spite of or despite of the notion that both graphite and carbon materials, when used as an anode active material, have serious SEI issue. This is truly unexpected.

Even more surprisingly, the meso-porous carbonaceous or graphitic materials, when incorporated as a cathode active material, having a specific surface area greater than 50 $m^2/g$ and pores of 2-50 nm in size, exhibit a specific capacity significantly higher than that of any commonly used lithium ion cell cathode. For instance, the micron-sized layered $LiCoO_2$ used in a lithium-ion battery exhibits a specific capacity typically lower than 160 mAh/g. The highest-capacity cathode active material for the lithium-ion cell is likely vanadium oxide that has a theoretical specific capacity of approximately 430 mAh/g, but a practically achievable capacity of 250 mAh/g. In contrast, we have routinely achieved a cathode specific capacity of 500-2,000 mAh/g when a meso-porous material is used as a cathode active material in a lithium-ion cell. It is of interest to note that graphitic or carbonaceous materials, when used as an SMC cathode, has not achieved a specific capacity above 500 mAh/g up to this point of time. These observations are well beyond the expectation of skilled artisans in the field of electrochemistry or battery industry.

In an embodiment of the present invention, one may choose to add a conductive additive and/or a binder material (e.g. binder resin or carbonized resin) to form an electrode (cathode or anode) of structural integrity. A conductive additive is generally needed in the anode of the presently invented anode since many of the non-carbon or non-graphite based anode active materials are inorganic materials (e.g., Si, SnO, and $Mn_3O_4$) that are not electrically conducting. The conductive additive or filler may be selected from any electrically conductive material, but is advantageously selected from graphite or carbon particles, carbon black, expanded graphite, graphene, carbon nanotube, carbon nano-fiber, carbon fiber, conductive polymer, or a combination thereof. The amount of conductive fillers is preferably no greater than 30% by weight based on the total cathode electrode weight (without counting the cathode current collector weight), preferably no greater than 15% by weight, and most preferably no greater than 10% by weight. The amount of binder material is preferably no greater than 15% by weight, more preferably no greater than 10%, and most preferably no greater than 5% by weight.

Preferred electrolyte types include liquid electrolyte, gel electrolyte, polymer electrolyte, solid electrolyte, and ionic liquid electrolyte (preferably containing lithium salts dissolved therein), or a combination thereof.

Although there is no limitation on the electrode thickness, the presently invented positive electrode preferably has a thickness greater than 100 μm, more preferably greater than 150 μm, and most preferably greater than 200 μm.

Another preferred embodiment of the present invention is a lithium-ion cell comprising:

(A) a cathode comprising a meso-porous graphitic or carbonaceous cathode active material having a surface area to capture and store lithium thereon and wherein the cathode forms a meso-porous structure having a pore in the size range of 2-50 nm and having a specific surface area greater than 50 $m^2/g$. The graphitic or carbonaceous material is selected from graphite worms, exfoliated graphite flakes, expanded graphite, chemically treated graphite with an inter-graphene planar separation no less than 0.4 nm (preferably greater than 0.5 nm, more preferably greater than 0.6 nm), soft carbon (preferably, chemically etched or expanded soft carbon), hard carbon (preferably, chemically etched or expanded hard carbon), activated carbon (preferably, exfoliated activated carbon), carbon black (preferably, chemically etched or expanded carbon black), chemically expanded multi-walled carbon nano-tube, chemically expanded carbon nano-fiber, or a combination thereof;

(B) An anode comprising a prelithiated anode active material for inserting and extracting lithium during a charge and discharge of the cell, wherein the anode active material is a nano particle, nano disc, nano platelete, nano wire, nano-rod, nano belt, nano scroll, nano tube, nano filament, nano coating, or nano film selected from: (a) a pre-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), or a mixture thereof; (b) a pre-lithiated alloy or inter-metallic compound of Si, Ge, Sn, Pb, Sb, Bi, Zn, Al, Ti, Co, Ni, Mn, Cd, or a mixture thereof; (c) a pre-lithiated oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof, (d) a pre-lithiated salt or hydroxide of Sn; or (e) a pre-lithiated carbon or graphite material, and wherein said anode active material is electrically connected directly to an anode current collector or is connected to an anode current collector through a binder and/or a conductive additive;

(C) a porous separator disposed between the anode and the cathode; and (D) a lithium-containing electrolyte in physical contact with the anode and the cathode. Since a prelithiated anode active material is implemented, an additional lithium source is not needed.

Figure 2:
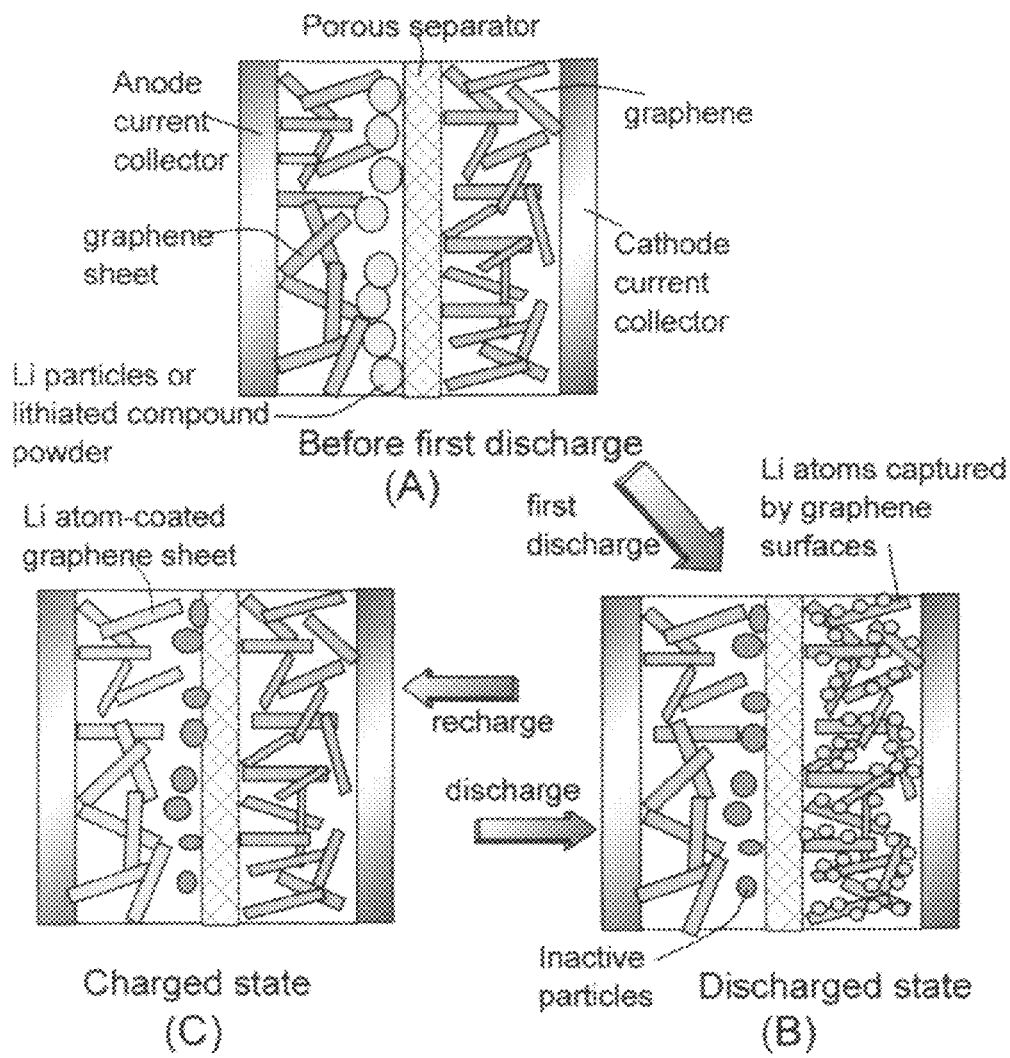
FIG. 2 (A) The structure of a SMC when it is made (prior to the first discharge or charge cycle), containing a nano-structured material at the anode, a lithium source (e.g. lithium foil, lithium powder, or lithiated compound powder dispersed in the liquid electrolyte of the anode zone), a porous separator, liquid electrolyte, a porous nano-structured material at the cathode having a high specific surface area; (B) The structure of this SMC after its first discharge operation (lithium is ionized with the lithium ions diffusing through liquid electrolyte to reach the surfaces of nano-structured cathode and get rapidly captured by these surfaces); (C) The structure of this battery device after being re-charged (lithium ions are released from the cathode surfaces, diffusing through liquid electrolyte to reach the surfaces of the nano-structured anode and get rapidly plated onto these surfaces). The large surface areas can serve as a supporting substrate onto which massive amounts of lithium ions can electro-deposit concurrently.
Figure 3:
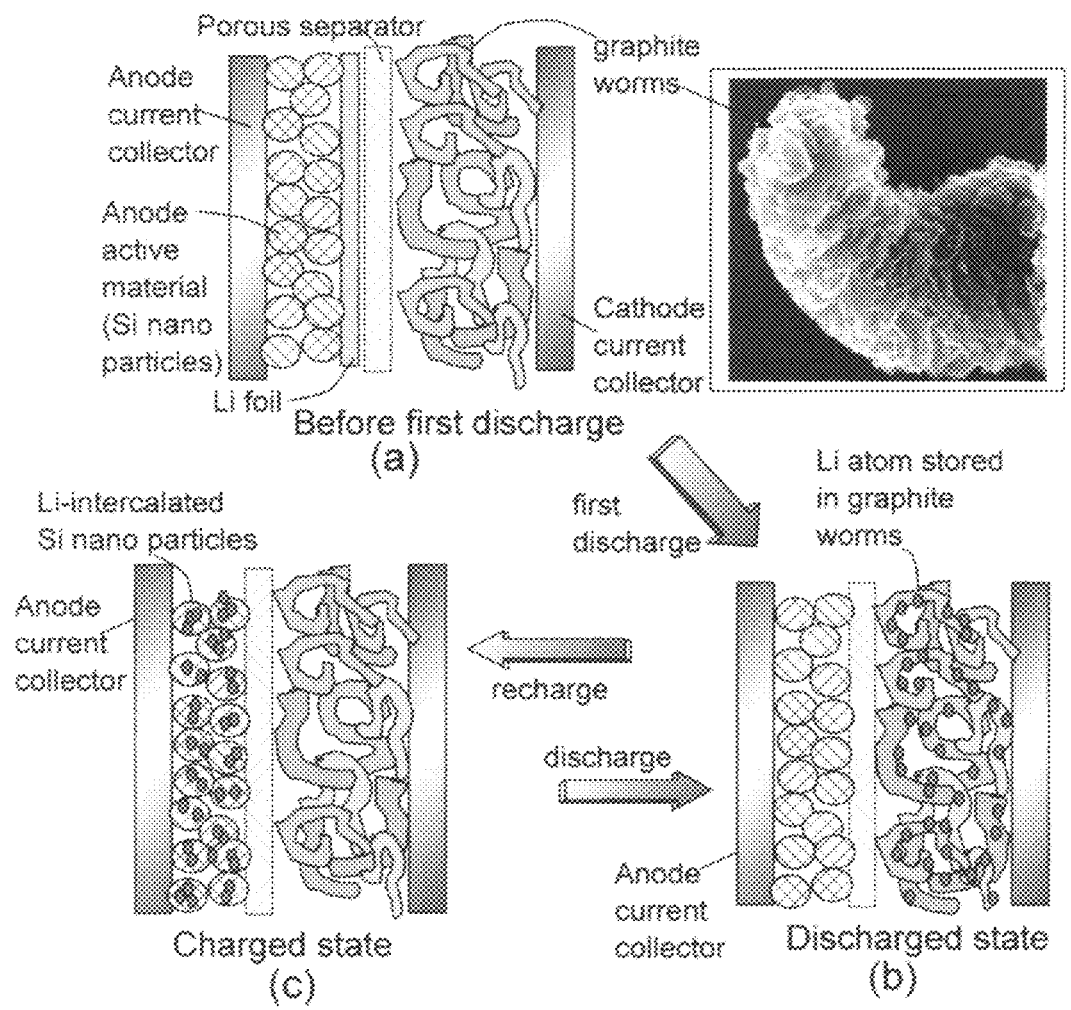
FIG. 3 (A) A lithium-ion cell containing a meso-porous graphitic material (e.g. graphite worms) as a cathode active material according to one embodiment of the instant invention. This is a schematic showing a possible structure of this new type of lithium-ion cell when it is made (prior to the first discharge or charge cycle); (B) The structure of this cell after its first discharge operation (lithium is ionized with the lithium ions diffusing through liquid electrolyte to reach the meso-porous graphitic material at the cathode); (C) The structure of this battery device after being re-charged (lithium ions are released from the cathode, diffusing through liquid electrolyte to reach the anode and intercalate into the interior of anode active material).

In some of our SMC cells disclosed recently, a lithiated compound was suggested as a possible lithium source (e.g, FIG. 2(A)), but this compound was not used as an anode active material. This prelithiated compound in a SMC was dispersed near an electrode to emit lithium ions into electrolyte so that these released lithium ions could be shuttled between anode surfaces and cathode surfaces. This compound was not connected to an anode current collector through a binder and/or a conductive additive. After the first discharge, this lithiated compound was completely dispersed in the electrolyte (FIG. 2(B)), no longer electrically connected to the anode or current collector. This lithiated compound was not an anode active material in a SMC and, after the first cycle, did not participate in lithium intercalation or de-intercalation after the first cycle (i.e. after the electrochemical formation step). Furthermore, this lithiated compound was not in the form of a nano particle, nano disc, nano platelete, nano wire, nano-rod, nano belt, nano scroll, nano tube, nano filament, nano coating, or nano film as herein specified.

In a further preferred embodiment, the anode active material contains a mixture of a high capacity anode material and a high rate capable anode material, wherein the high rate capable anode material is selected from nano-scaled particles or filaments of a lithium transition metal oxide, lithiated $Co_3O_4$, lithiated $Mn_3O_4$, lithiated $Fe_3O_4$, $Li_4Ti_5O_{12}$, or a combination thereof, and the high capacity anode material is selected from pre-lithiated Si, Ge, Sn, SnO, or a combination thereof.

Preferably, the anode active material is prelithiated to an initial specific capacity of no less than 500 mAh/g (more preferably no less than 700 mAh/g, even more preferably no less than 1,000 mAh/g, further preferably no less than 1,500 mAh/g, and most preferably no less than 2,000 mAh/g) based on the anode active material weight. Preferably, when the lithium-ion cell containing such a prelithiated anode active material is discharged, the anode active material is not fully discharged; instead, the anode active material maintains at least 50% of the initial specific capacity. Materials such as Si, Ge, and Sn oxide can be prelithiated to an initial capacity of >1000 mAh/g; Si can be prelithiated to >4,000 mAh/g. These are preferred choices for an anode active material.

Figure 4A:
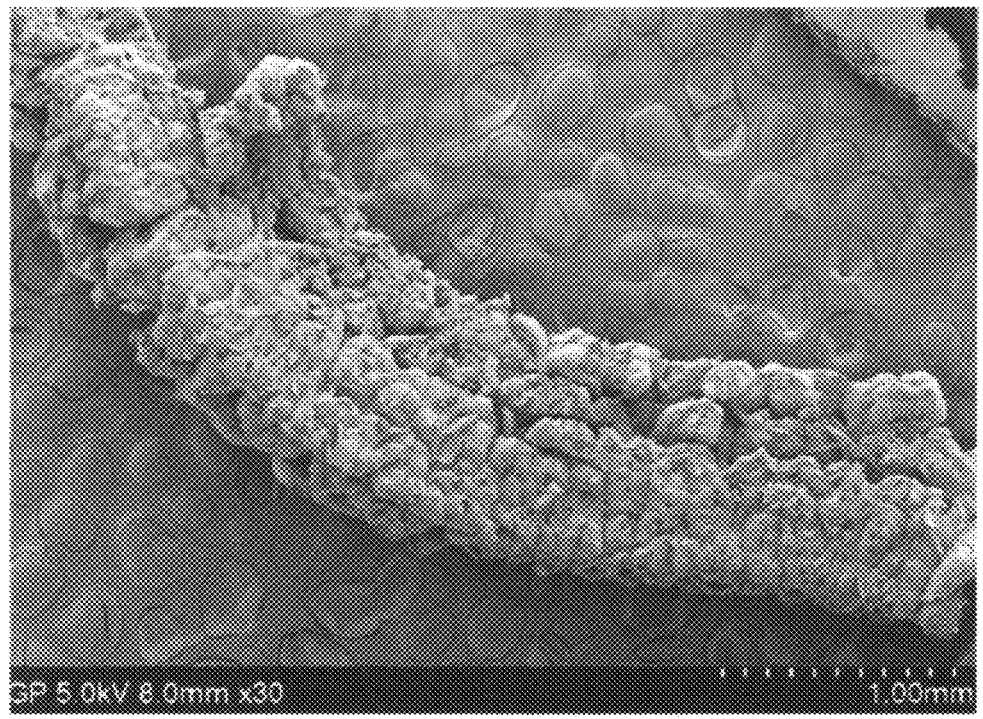
FIG. 4 (A) SEM image of a graphite worm; (B) SEM image of another graphite worm taken at a higher magnification; (C) SEM image of a meso-porous graphitic structure prepared by exfoliating a soft carbon; (D) SEM image of a meso-porous graphitic structure prepared by chemically etching or expanding a hard carbon material; (E) SEM image of an expanded MCMB; and (F) SEM image of expanded carbon fibers.
Figure 4B:
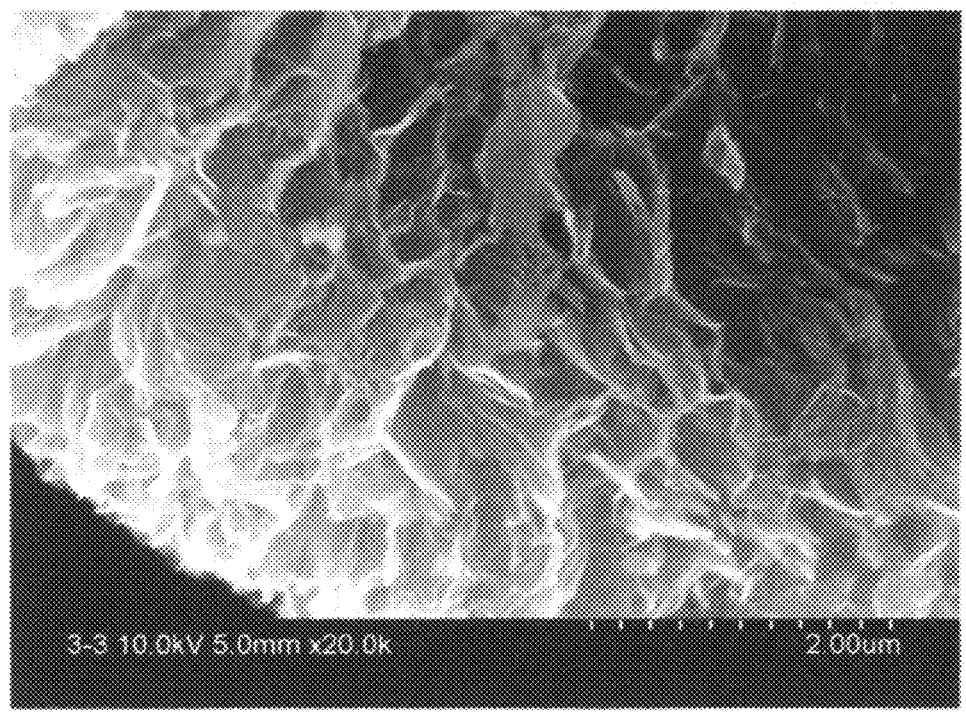
Figure 4C:
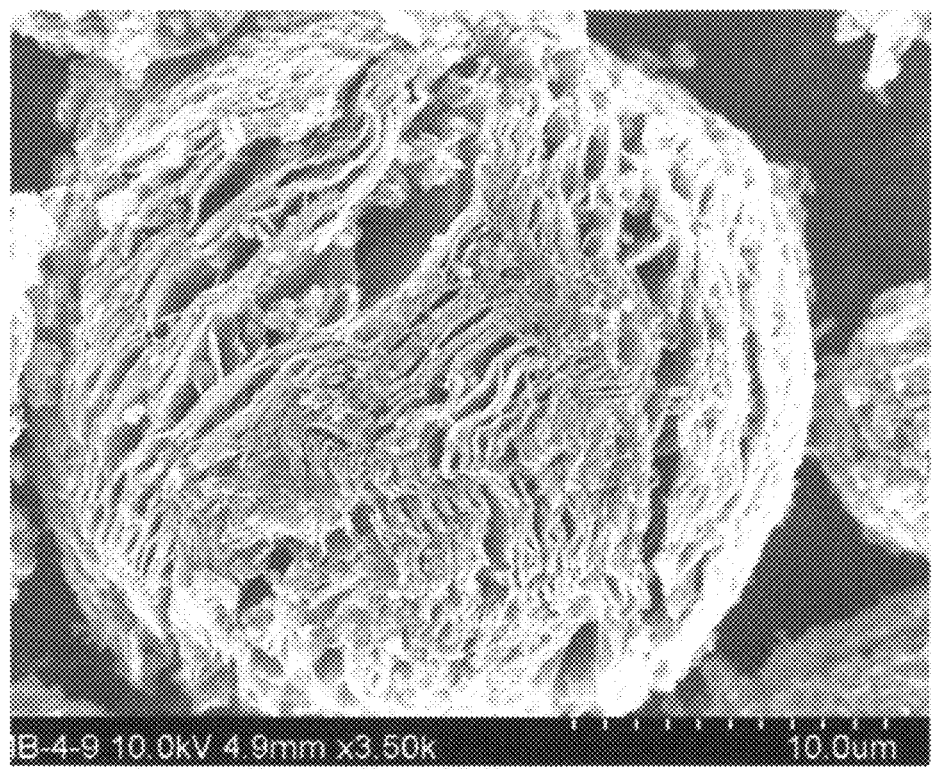
Figure 4D:
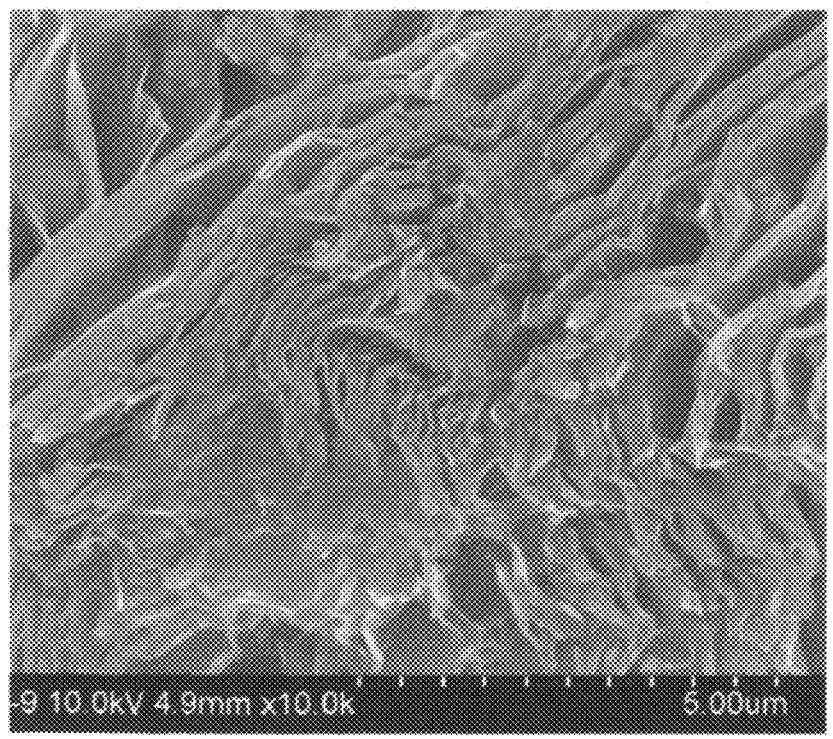
Figure 4E:
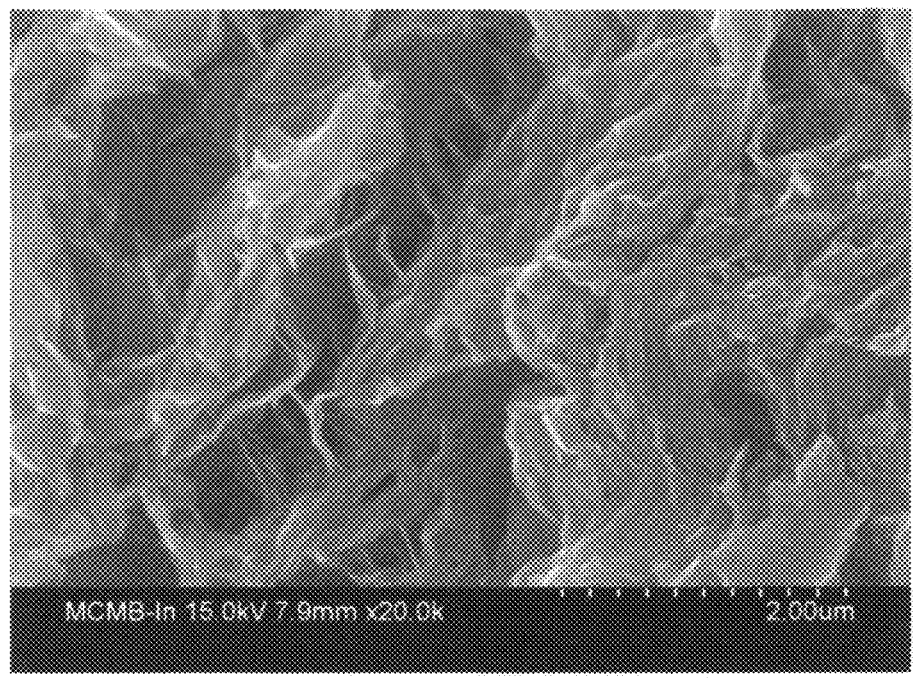
Figure 4F:
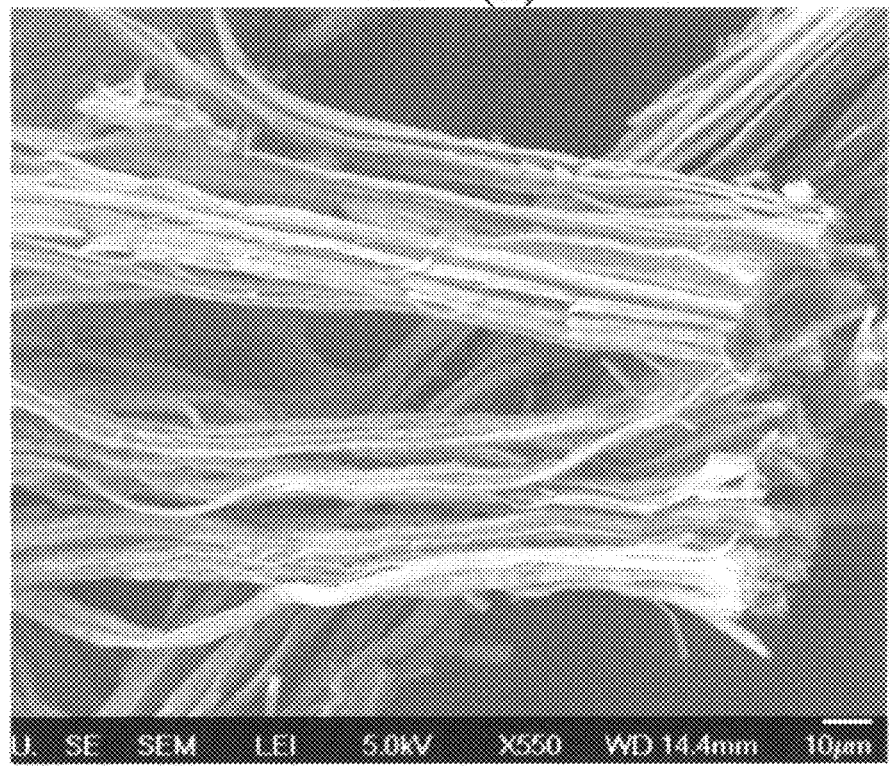

The meso-porous carbonaceous or graphitic material for use in the cathode of the instant invention may be graphite worms (e.g. FIGS. 4(A) and (B)), exfoliated graphite flakes (with a thickness >100 nm), expanded graphite (with a thickness >100 nm), chemically treated graphite with an inter-graphene planar separation no less than 0.4 nm (preferably greater than 0.5 nm, more preferably greater than 0.6 nm), soft carbon (preferably, chemically etched or expanded soft carbon, FIG. 4(C)), hard carbon (preferably, chemically etched or expanded hard carbon, FIG. 4(D)), activated carbon (preferably, exfoliated activated carbon), carbon black (preferably, chemically etched or expanded carbon black), chemically expanded multi-walled carbon nano-tube, chemically expanded carbon fiber (FIG. 4(E)) or nano-fiber, or a combination thereof. These carbonaceous or graphitic materials have one thing in common; they all have meso-scaled pores, enabling entry of electrolyte to access their interior graphene planes. For instance, FIG. 4(A) shows the fluffy, worm-like structure of "graphite worms" which is each composed of interconnected graphite flakes with meso pores interspersed between flakes, further shown in FIG. 4(B).

In one preferred embodiment, the meso-porous carbonaceous or graphitic material may be produced by using the following recommended procedures:
(a) dispersing or immersing a graphitic or carbonaceous material (e.g., powder of natural graphite, artificial graphite, meso-phase carbon, meso-carbon micro bead (MCMB), soft carbon, hard carbon, coke, polymeric carbon (carbonized resin), activated carbon (AC), carbon black (CB), multi-walled carbon nanotube (MWCNT), carbon nano-fiber (CNF), carbon or graphite fiber, meso-phase pitch fiber, and the like) in a mixture of an intercalant and/or an oxidant (e.g., concentrated sulfuric acid and nitric acid) and/or a fluorinating agent to obtain a graphite intercalation compound (GIC), graphite oxide (GO), graphite fluoride (GF), or chemically etched/treated carbon material;
(b) exposing the resulting GIC, GO, GF, or chemically etched/treated carbon material to a thermal shock, preferably in a temperature range of 600-1,100° C. for a short period of time (typically 15 to 60 seconds) to obtain exfoliated graphite or graphite worms; and optionally
(c) subjecting the resulting graphite worms to air jet milling to obtain expanded graphite (with graphite flakes thicker than 100 nm).

Alternatively, after step (a) above, the resulting GIC, GO, GF, or chemically etched/treated carbon/graphite material is subjected to repeated rinsing/washing to remove excess chemical. The rinsed products are then subjected to a drying procedure to remove water. The dried GO, GF, chemically treated CB, chemically treated AC, chemically treated MWCNT, chemically treated CNF, chemically treated carbon/graphite/pitch fiber can be used as a cathode active material of the presently invented high-capacity Li-ion cell. These chemically treated carbonaceous or graphitic materials can be further subjected to a heat treatment at a temperature preferably in the range of 150-1,100° C. for the purposes of thermally reducing the oxidized material, thermally exfoliating/expanding the carbonaceous/graphitic material (for increasing inter-planar spacing between two hexagonal carbon planes or graphene planes), and/or creating meso-scaled pores (2-50 nm) to enable the interior structure being accessed by electrolyte. It may be noted that these interior graphene planes remain stacked and interconnected with one another, but the above-described chemical/thermal treatments facilitate direct access of these interior graphene planes by lithium ion-carrying electrolyte.

The broad array of carbonaceous materials, such as a soft carbon, hard carbon, polymeric carbon (or carbonized resin), meso-phase carbon, coke, carbonized pitch, carbon black, activated carbon, or partially graphitized carbon, are commonly referred to as the disordered carbon material. A disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. Typically, the disordered carbon is highly porous (e.g., exfoliated activated carbon), or present in an ultra-fine powder form (e.g. chemically etched carbon black) having nano-scaled features (e.g. having meso-scaled pores and, hence, a high specific surface area).

Soft carbon refers to a carbonaceous material composed of small graphite crystals wherein the orientations of these graphite crystals or stacks of graphene planes inside the material are conducive to further merging of neighboring graphene sheets or further growth of these graphite crystals or graphene stacks using a high-temperature heat treatment. This high temperature treatment is commonly referred to as graphitization and, hence, soft carbon is said to be graphitizable.

Hard carbon refers to a carbonaceous material composed of small graphite crystals wherein these graphite crystals or stacks of graphene planes inside the material are not oriented in a favorable directions (e.g. nearly perpendicular to each other) and, hence, are not conducive to further merging of neighboring graphene planes or further growth of these graphite crystals or graphene stacks (i.e., not graphitizable).

Carbon black (CB) (including acetylene black, AB) and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc). These materials per se (without chemical/thermal treatments as described above) are not good candidate cathode materials for the presently invented high-capacity Li-ion cells. Hence, preferably, they are subjected to further chemical etching or chemical/thermal exfoliation to form a meso-porous structure having a pore size in the range of 2-50 nm (preferably 2-10 nm). These meso-scaled pores enable the liquid electrolyte to enter the pores and access the graphene planes inside individual particles of these carbonaceous materials.

The preparation of polymeric carbons by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electro-active materials whose structures and physical properties can be readily tailor-made.

Polymeric carbons can assume an essentially amorphous structure, or have multiple graphite crystals or stacks of graphene planes dispersed in an amorphous carbon matrix. Depending upon the HTT used, various proportions and sizes of graphite crystals and defects are dispersed in an amorphous matrix. Various amounts of two-dimensional condensed aromatic rings or hexagons (precursors to graphene planes) can be found inside the microstructure of a heat treated polymer such as a PAN fiber. An appreciable amount of small-sized graphene sheets are believed to exist in PAN-based polymeric carbons treated at 300-1,000° C. These species condense into wider aromatic ring structures (larger-sized graphene sheets) and thicker plates (more graphene sheets stacked together) with a higher HTT or longer heat treatment time (e.g., >1,500° C.). These graphene platelets or stacks of graphene sheets (basal planes) are dispersed in a non-crystalline carbon matrix. Such a two-phase structure is a characteristic of some disordered carbon material.

There are several classes of precursor materials to the disordered carbon materials of the instant patent application. For instance, the first class includes semi-crystalline PAN in a fiber form. As compared to phenolic resin, the pyrolized PAN fiber has a higher tendency to develop small crystallites that are dispersed in a disordered matrix. The second class, represented by phenol formaldehyde, is a more isotropic, essentially amorphous and highly cross-linked polymer. The third class includes petroleum and coal tar pitch materials in bulk or fiber forms. The precursor material composition, heat treatment temperature (HTT), and heat treatment time (Htt) are three parameters that govern the length, width, thickness (number of graphene planes in a graphite crystal), and chemical composition of the resulting disordered carbon materials.

In the present investigation, PAN fibers were subjected to oxidation at 200-350° C. while under a tension, and then partial or complete carbonization at 350-1,500° C. to obtain polymeric carbons with various nano-crystalline graphite structures (graphite crystallites). Selected samples of these polymeric carbons were further heat-treated at a temperature in the range of 1,500-2,000° C. to partially graphitize the materials, but still retaining a desired amount of amorphous carbon (no less than 10%). Phenol formaldehyde resin and petroleum and coal tar pitch materials were subjected to similar heat treatments in a temperature range of 500 to 1,500° C. The disordered carbon materials obtained from PAN fibers or phenolic resins are preferably subjected to a chemical etching/expanding treatment using a process commonly used to produce activated carbon (e.g., treated in a KOH melt at 900° C. for 1-5 hours). This chemical treatment is intended for making the disordered carbon meso-porous, enabling electrolyte to reach the edges or surfaces of the constituent aromatic rings after a battery cell is made. Such an arrangement enables the lithium ions in the liquid electrolyte to readily attach onto exposed graphene planes or edges without having to undergo significant solid-state diffusion.

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce isolated meso-phase particles or spheres, which can be further carbonized and graphitized.

The following examples serve to illustrate the preferred embodiments of the present invention and should not be construed as limiting the scope of the invention:

EXAMPLE 1

Meso-porous Soft Carbon

Chemically etched or expanded soft carbon was prepared from a liquid crystalline aromatic resin. The resin was ground with a mortar, and calcined at 900° C. for 2 h in a $N_2$ atmosphere to prepare the graphitizable carbon or soft carbon. The resulting soft carbon was mixed with small tablets of KOH (four-fold weight) in an alumina melting pot. Subsequently, the soft carbon containing KOH was heated at 750° C. for 2 h in $N_2$. Upon cooling, the alkali-rich residual carbon was washed with hot water until the outlet water reached a pH value of 7. The resulting chemically etched or expanded soft carbon was dried by heating at 60° C. in a vacuum for 24 hours.

EXAMPLE 2

Expanded Activated Carbon (E-AC)

Activated carbon (AC, from Ashbury Carbon Co.) was treated with an acid solution (sulfuric acid, nitric acid, and potassium permanganate at a ratio of 4:1:0.05) for 24 hours. Upon completion of the reaction, the mixture was poured into deionized water and filtered. The treated. AC was repeatedly washed in a 5% solution of HCl to remove most of the sulphate ions. The sample was then washed repeatedly with deionized water until the pH of the filtrate was neutral. The slurry was then dried in a vacuum oven pre-set at 70° C. for 24 hours. The dried sample was then placed in a tube furnace at 1,050° C. for 2 minutes to obtain expanded AC.

EXAMPLE 3

Chemically Treated Needle Coke

Anisotropic needle coke has a fully developed needle-shape texture of optical anisotropy. Volatile species of the raw coke was estimated to be around 5 wt. %. Activation was carried out using KOH in a reaction apparatus that consisted of a stainless steel tube and a nickel sample holder. KOH activation was carried out at 800° C. for 2 h under Ar flow. The coke/KOH ratio was varied between 1/1 and 1/4. Upon cooling, the alkali-rich coke was washed with hot water until the outlet water reached a pH value of 7. The resulting chemically etched or expanded coke was dried by heating at 60° C. in a vacuum for 24 hours.

EXAMPLE 4

Chemically Treated Petroleum Pitch-Derived Hard Carbon

A pitch sample (A-500 from Ashland Chemical Co.) was carbonized in a tube furnace at 900° C. for 2 hours, followed by further carbonization at 1,200° C. for 4 hours. KOH activation was carried out at 800° C. for 2 h under Ar flow to open up the internal structure of pitch-based hard carbon particles.

EXAMPLE 5

Chemically Expanded Meso-phase Carbon

Meso-carbon microbeads (MCMBs) were supplied from China Steel Chemical Co. This material has a density of about 2.24 g/cm$^3$ with a median particle size of about 16 μm. The MCMB powder was immersed in $K_2CO_3$ at 900° C. for 1 h. The chemically treated meso-phase carbons showed a BET specific surface area of 1,420 m$^2$/g.

EXAMPLE 6

Graphitic Fibrils from Pitch-based Carbon Fibers

Fifty grams of graphite fibers from Amoco (P-55S) were intercalated with a mixture of sulfuric acid, nitric acid, and potassium permanganate at a weight ratio of 4:1:0.05 (graphite-to-intercalate ratio of 1:3) for 24 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds. The sample was then submitted to a mechanical shearing treatment in a Cowles (a rotating-blade dissolver/disperser) for 10 minutes. The resulting graphitic fibrils were examined using SEM and TEM and their length and diameter were measured.

EXAMPLE 7

Expanded Multi-walled Carbon Nanotubes (MWCNTs)

Fifty grams of MWCNTs were chemically treated (intercalated and/or oxidized) with a mixture of sulfuric acid, nitric acid, and potassium permanganate at a weight ratio of 4:1:0.05 (graphite-to-intercalate ratio of 1:3) for 48 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds.

EXAMPLE 8

Lithium-ion Cells Featuring Prelithiated and Non-lithiated Cobalt Oxide ($Co_3O_4$) Anodes and Meso-porous Soft Carbon Cathode (MSCC)

An appropriate amount of inorganic salts $Co(NO_3)_2 \cdot 6H_2O$ was added to an ammonia solution ($NH_3 \cdot H_2O$, 25 wt %). The resulting precursor suspension was stirred for 4 hours under an argon flow condition to ensure a complete reaction. The resulting $Co(OH)_2$ precursor suspension was filtered and dried under vacuum at 70° C. to obtain a $Co(OH)_2$. This precursor was calcined at 450° C. in air for 2 h to form $Co_3O_4$ powder.

The working electrodes (for use as an anode in a lithium-ion cell) were prepared by mixing 85 wt % active material ($Co_3O_4$ powder), 7 wt % acetylene black (Super-P), and 8 wt % polyvinylidene fluoride (PVDF, 5 wt % solid content) binder dissolved in N-methyl-2-pyrrolidinoe (NMP) to form a slurry-like mixture. After coating the slurry on Cu foil, the electrode was dried at 120° C. in vacuum for 2 h to remove the solvent before pressing. The electrode prepared was divided into two pieces: one piece was for use as a non-prelithiated anode and the other piece was prelithiated electrochemically by following the procedure described below:

The second piece of $Co_3O_4$ electrode was immersed in a liquid electrolyte prepared by dissolving 1 M $LiPF_6$ electrolyte solution in a mixture of ethylene carbonate (EC) and diethyl carbonate (DEC) (EC-DEC, 1:1 v/v). A piece of lithium foil was used as a counter-electrode, which was also immersed in the electrolyte. Direct current was used to charge the $Co_3O_4$ electrode until an amount of lithium equivalent to approximately 860 mAh/g based on cobalt oxide weight was inserted into $Co_3O_4$. The prelithiation procedure was performed in an argon-filled glove-box.

Subsequently, the lithiated and non-lithiated electrodes were separately cut into disks (diameter=12 mm) for use as an anode. In the cell containing a non-lithiated $Co_3O_4$ anode, a thin sheet of lithium foil (as a lithium source) was attached to the anode surface and a piece of porous separator was, in turn, stacked on top of the lithium foil. Pieces of electrodes prepared from the meso-porous carbon of example 1 and coated on an aluminum foil (cathode current collector) were used as a cathode to form a CR2032 coin-type cell. Celgard 2400 membrane was used as separator, and 1M $LiPF_6$ electrolyte solution dissolved in a mixture of ethylene carbonate (EC) and diethyl carbonate (DEC) (EC-DEC, 1:1 v/v) was used as cell electrolyte. The cell assembly was performed in an argon-filled glove-box. The CV measurements were carried out using a CHI-6 electrochemical workstation at a scanning rate of 1 mV/s.

COMPARATIVE EXAMPLE 8

Li-ion Cells Containing a Prelithiated or Non-Lithiated Cobalt Oxide ($Co_3O_4$) Anode and a Lithium Iron Phosphate Cathode Lithium iron phosphate $LiFePO_4$ is a promising candidate cathode material in lithium-ion batteries for electric vehicle applications. The advantages of $LiFePO_4$ as a cathode active material includes a high theoretical capacity (170 mAh/g), environmental benignity, low resource cost, good cycling stability, high temperature capability, and prospect for a safer cell compared with $LiCoO_2$. For comparison purposes, we have also prepared similar Li-ion cells containing LiFePO$_4$ as the cathode active material, instead of the meso-porous soft carbon cathode (MSCC).

The electrochemical performance of the prelithiated Co$_3$O$_4$ anode/MSCC cell, non-lithiated Co$_3$O$_4$/Li source/ MSCC cell, lithiated Co$_3$O$_4$/LiFePO$_4$ cell, and non-lithiated Co$_3$O$_4$/LiFePO$_4$ cell was also evaluated by galvanostatic charge/discharge cycling at a current density of 50 mA/g, using a LAND electrochemical workstation.

Figure 5:
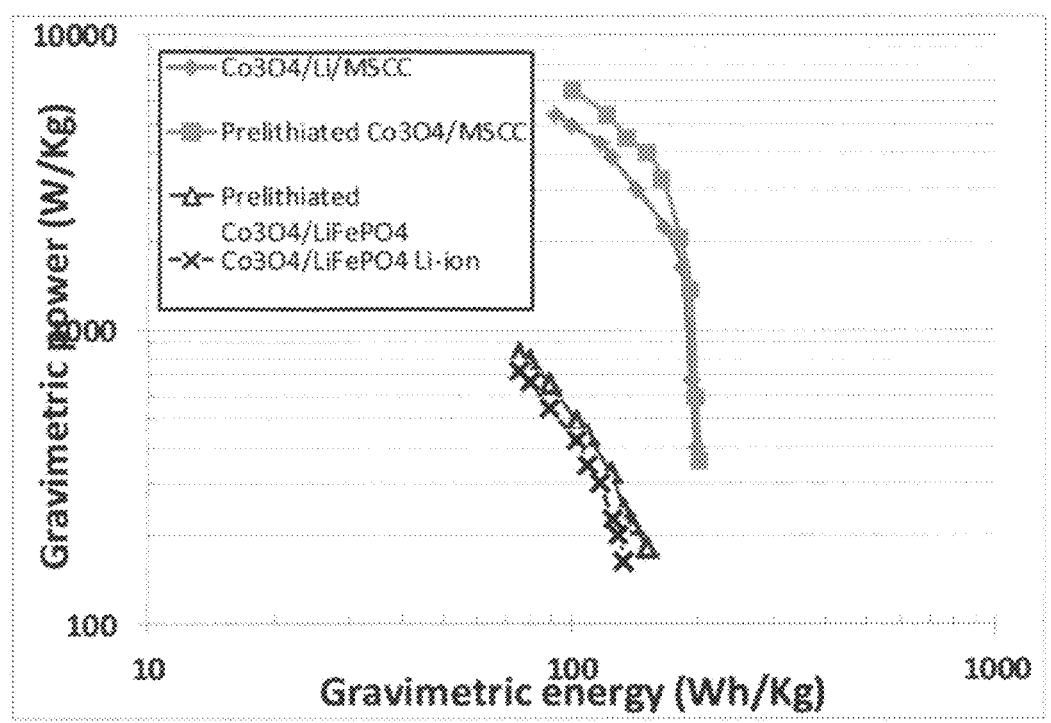
FIG. 5 Ragone plot of four types of electrochemical cells: (i) a Li-ion cell using chemically expanded soft carbon as a cathode active material, a $Co_3O_4$ anode active material, and a Li foil as a lithium source; (ii) another lithium-ion cell using chemically expanded soft carbon as a cathode active material and a prelithiated $Co_3O_4$ anode active material; (iii) a prior art Li-ion cell using prelithiated $Co_3O_4$ as the anode active material and $LiFePO_4$ as the cathode active material; and (iv) another prior art Li-ion cell using non-prelithiated $Co_3O_4$ as the anode active material and $LiFePO_4$ as the cathode active material.

The Ragone plots of four types of electrochemical cells are presented in FIG. 5. These data have demonstrated that the presently invented L-ion cells using MSCC as a cathode active material exhibit exceptional energy density and relatively good power density. Both of the new cells (one having a non-lithiated Co$_3$O$_4$ anode active material and Li foil as a lithium source and the other having a prelithiated Co$_3$O$_4$ anode active material) have an energy density higher than 210 Wh/kg, which is significantly greater than the typical 120-150 Wh/kg of prior art lithium-ion cells. Most surprisingly, these cells can also deliver a power density that is 10 times higher than those of prior art Li-ion cells (typically <0.5 kW/kg). The power density of the new cell reaches 6.7 kW/kg, which has never been achieved with any prior art lithium-ion cells. The implementation of meso-porous soft carbon as a cathode active material has made it possible to achieve both high energy density and high power density. As a point of reference, the typical power density of symmetric supercapacitors (noted for their superior power density) is 3-6 kW/kg; but their energy density is 5-8 Wh/kg. The presently invented Li-ion cells have achieved both high energy density and high power density that cannot be achieved with current supercapacitors or lithium-ion batteries.

EXAMPLE 9

Li-ion Cells Having a Prelithiated Tin Oxide (Nano- and Micron-Scaled) Anode and an Expanded Activated Carbon Cathode (E-AC)

Tin oxide (SnO$_2$) nano particles were obtained by the controlled hydrolysis of SnCl$_4$.5H$_2$O with NaOH using the following procedure: SnCl$_4$.5H$_2$O (0.95 g, 2.7 m-mol) and NaOH (0.212 g, 5.3 m-mol) were dissolved in 50 mL of distilled water each. The NaOH solution was added drop-wise under vigorous stirring to the tin chloride solution at a rate of 1 mL/min. This solution was homogenized by sonication for 5 min. This solution was divided into two portions. One portion of the resulting hydrosol was reacted with a graphene oxide dispersion supplied by Angstron Materials, Inc. (Dayton, Ohio) for 3 hours and the other portion was not mixed with graphene oxide.

To this graphene oxide mixed solution and un-mixed solution separately, few drops of 0.1 M of H$_2$SO$_4$ were added to flocculate the product. The precipitated solid was collected by centrifugation, washed with water and ethanol, and dried in vacuum. The dried product was heat-treated at 400° C. for 2 h under Ar atmosphere. The graphene oxide-assisted sample was found to contain mostly nano-scaled tin oxide particles with an average particle size of 27 nm. The presence of graphene oxide serves to regulate the nucleation and growth of tin oxide crystals, promoting the formation of nano particles. The other sample contains sub-micron and micron-scaled tin oxide particles with an average diameter >1.3 μm.

The battery cells from the graphene oxide-regulated particulates (containing nano-scaled SnO$_2$) and the micron-scaled SnO$_2$ particles (having acetylene black particles as a conductive filler) were prepared using a procedure described in Example 8. The tin oxide was electrochemically prelithiated up to a specific capacity of approximately 1,200 mAh/g. The testing methods were also similar to those used in Example 8.

COMPARATIVE EXAMPLE 9B

Prelithiated Tin Oxide as the Anode Active Material and LiCoO$_2$ as the Cathode Active Material in a Conventional Li-ion Cell For comparison purposes, we have also prepared a corresponding lithium-ion cell containing prelithiated tin oxide as the anode active material and LiCoO$_2$ as the cathode active material.

Figure 6:
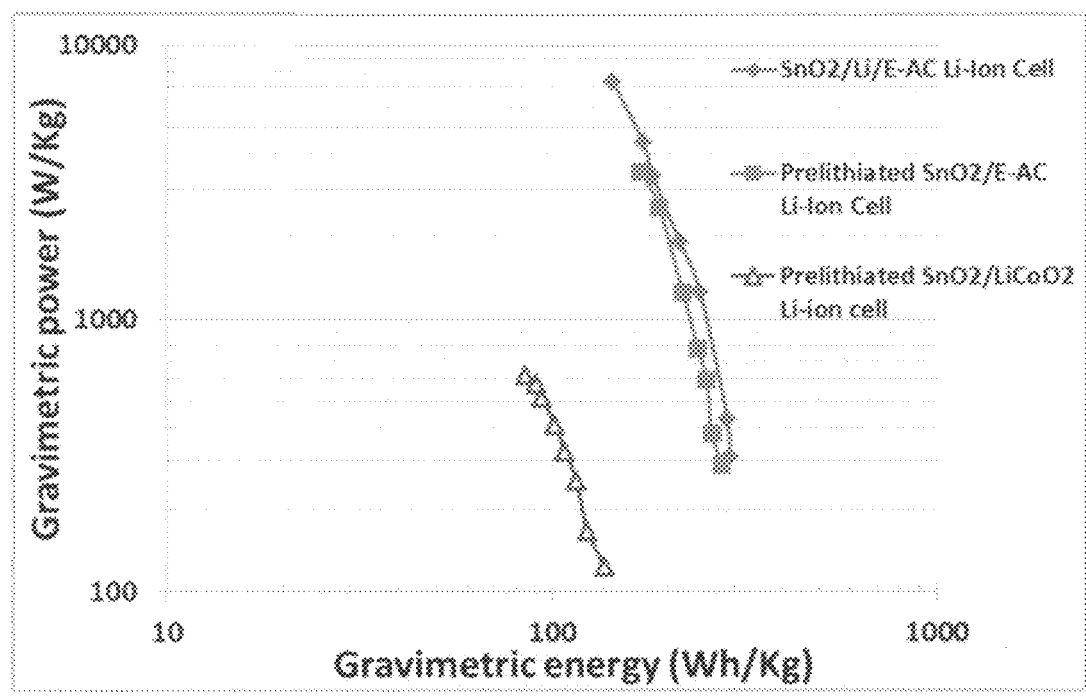
FIG. 6 Ragone plot of four types of electrochemical cells: (i) a Li-ion cell using expanded activated carbon (E-AC) as a cathode active material, $SnO_2$ as an anode active material, and Li foil as a lithium source; (ii) another lithium-ion cell using E-AC as a cathode active material and prelithiated $SnO_2$ as an anode active material; (iii) a prior art SMC cell using E-AC as an anode active material, prelithiated $SnO_2$ powder as the lithium source (not as an anode active material), and E-AC as the cathode active material; and (iv) a prior art Li-ion cell using prelithiated $SnO_2$ as the anode active material and $LiCoO_2$ as a cathode active material.

Presented in FIG. 6 are the Ragone plots of four types of electrochemical cells. Two of the cells represent two examples of the presently invented E-AC cathode-based Li-ion cells: one containing non-lithiated SnO$_2$ as an anode active material and Li foil as a lithium source and the other containing prelithiated SnO$_2$ as an anode active material. In both cases, the SnO$_2$ particles were bonded to the anode current collector with a resin binder, along with a conductive additive. The cell with a lithium source exhibits a higher energy density. These two cells exhibit an exceptionally high energy density (~300 Wh/kg), which is significantly greater than those of a prior art Li-ion cell (using prelithiated SnO$_2$ as the anode active material and LiCoO$_2$ as a cathode active material). There has been no cathode material thus far reported that could enable a lithium-ion cell containing a non-Si anode to exhibit an energy density higher than 300 Wh/kg. This is undeniably a very impressive and unexpected result.

EXAMPLE 10

Prelithiated Si Nanowires and Prelithiated Si Micron Particles as an Anode Active Material and Chemically Treated or Expanded MCMB as a Cathode Active Material In a typical procedure for preparing Si nanowires, approximately 2.112 g of silicon powders (average diameter 2.64 μm) were mixed with 80 ml of a 0.1M aqueous solution of Ni(NO$_3$)-6H$_2$O and vigorously stirred for 30 min. Then, water was evaporated in a rotary evaporator and the solid remnants were completely dried in an oven at 150° C. The final sample (Ni-impregnated Si powers) was obtained by grinding the solids in a mortar.

Subsequently, 0.03 g of Ni-impregnated Si particles was placed in a quartz boat, and the boat was placed in a tube furnace. The sample was reduced at 500° C. for 4 hours under flowing Ar (180 seem) and H$_2$ (20 sccm); then the temperature was raised to 990° C. to synthesize Si nanowires. For the purpose of separating Si nanowires, for instance, every 0.1 g of the reacted Si powders was mixed with 10 ml of ethanol and the resulting mixture was sonicated for 1 hour. Subsequently, Si nanowires were separated from the Si powders by centrifuging at 5,000 rpm for 10 min.

Si nanowires and Si micron particles, separately, were mixed with acetylene black particles to prepare anodes. The electrodes made were lithiated by using a procedure similar to that described in Example 8. Coin cells were similarly made using chemically expanded MCMBs (E-MCMB) prepared in Example 5 as the cathode active material.

Coin cells using E-MCMB as a cathode active material (90% E-MCMB and 10% PVDF as a resin binder) and prelithiated Si particles as an anode active material were made and tested. In all cells, the separator used was one sheet of micro-porous membrane (Celgard 2500). The current collector for the cathode was a piece of carbon-coated aluminum foil and that for the anode was Cu foil. The electrolyte solution was 1M $LiPF_6$ dissolved in a mixture of ethylene carbonate (EC) and dimethyl carbonate (DMC) with a 3:7 volume ratio. The separator was wetted by a minimum amount of electrolyte to reduce the background current. Cyclic voltammetry and galvanostatic measurements of the lithium cells were conducted using an Arbin 32-channel supercapacitor-battery tester at room temperature (in some cases, at a temperature as low as −40° C. and as high as 60° C.).

COMPARATIVE EXAMPLE 10A

A SMC with a Prelithiated E-MCMB Anode and an E-MCMB Cathode

For comparison, a surface-mediated cell (SMC) using the same E-MCMB cathode was prepared. This SMC contains a small amount of E-MCMB coated on a copper foil as an anode (but without the prelithiated Si nano-wires), and a piece of lithium foil as a lithium source.

COMPARATIVE EXAMPLE 10B

Conventional Li-Ion Cell Featuring Prelithiated Si Nanowires as the Anode Active Material and $LiFePO_4$ as the Cathode Active Material For comparison purposes, we have also prepared similar Li-ion cells containing prelithiated Si Nanowires as the anode active material and $LiFePO_4$ as the cathode active material, instead of graphene cathode.

Figure 7:
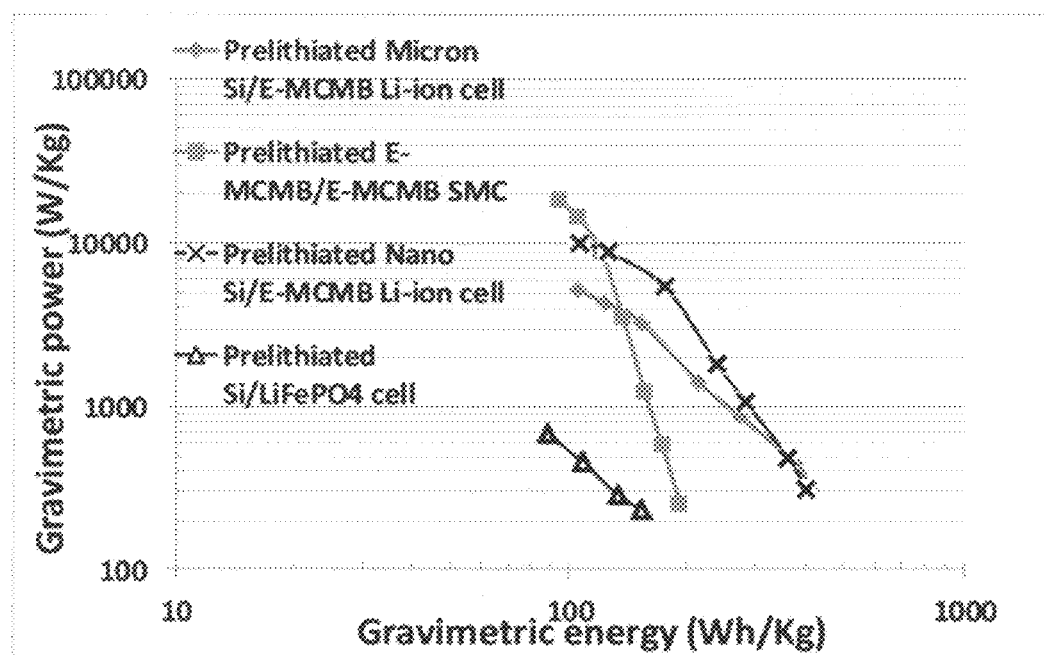
FIG. 7 Ragone plot of four types of electrochemical cells: (i) a Li-ion cell using chemically expanded meso-carbon micro-beads (E-MCMB) as a cathode active material and prelithiated micron-scaled Si particles as an anode active material; (ii) another lithium-ion cell using E-MCMB as a cathode active material and prelithiated Si nanowires as an anode active material; (iii) a prior art SMC cell using prelithiated E-MCMB as the anode active material and non-lithiated E-MCMB as the cathode active material; and (iv) a prior art Li-ion cell using prelithiated Si nanowires as the anode active material and LiFePO$_4$ as a cathode active material.

The Ragone plots of four types of electrochemical cells are shown in FIG. 7. Both E-MCMB cathode-based L-ion cells of the present invention are capable of delivering an energy density greater than 400 Wh/kg, an unprecedented value of all lithium-ion cells ever reported. These cells are also capable of delivering a power density of 5-10 kW/kg, comparable to those of the best symmetric supercapacitors. The anode containing Si nano-wires appear to deliver a higher power density as compared with its micron particle counterpart. The prior art SMC cell using prelithiated E-MCMB as an anode active material and non-lithiated E-MCMB as the cathode active material delivers a highest power density due to the notion that its operation at both the anode and the cathode is lithium intercalation-free. However, the two lithium-ion cells can store three times higher amount of energy per unit cell weight as compared to their SMC counterparts.

EXAMPLE 11

Prelithiated Si Nanowires as an Anode Active Material and Chemically Treated or Expanded MWCNT as a Cathode Active Material A Li-ion cell similar to that presented in Example 10, but with an E-MWCNT cathode, was prepared and evaluated.

COMPARATIVE EXAMPLE 11A

A Cell with a Prelithiated Non-Expanded MWCNT Anode and a Non-Expanded MWCNT Cathode and Another Cell with a Prelithiated Expanded MWCNT Anode and an Expanded MWCNT Cathode For comparison, a cell using a non-expanded MWCNT cathode was prepared. This cell contains a small amount of non-treated MWCNT coated on a copper foil as an anode (but without the prelithiated Si nano-wires), and a piece of lithium foil as a lithium source. A similar cell with both the anode and the cathode containing expanded MWCNT was also prepared and tested.

Figure 8:
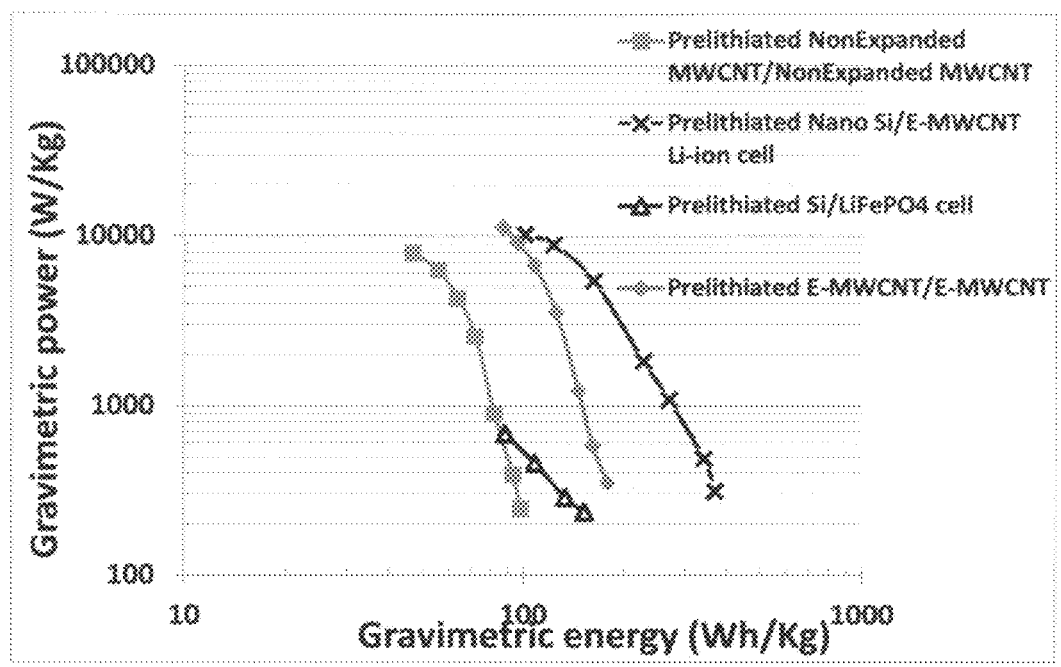
FIG. 8 Ragone plot of four types of electrochemical cells: (i) a lithium-ion cell using chemically expanded multi-wall carbon nanotubes (E-MWCNT) as a cathode active material and prelithiated Si nanowires as an anode active material; (ii) a prior art SMC cell using prelithiated E-MWCNT as an anode active material and non-lithiated E-MWCNT as a cathode active material; (iii) a prior art SMC cell using prelithiated non-expanded MWCNT as an anode active material and non-expanded MWCNT as a cathode active material; and (iv) a prior art Li-ion cell using prelithiated Si nanowires as the anode active material and LiFePO$_4$ as a cathode active material.

The Ragone plots of four types of electrochemical cells are shown in FIG. 8. The E-MWCNT cathode-based Li-ion cell of the present invention is capable of storing an energy density greater than 360 Wh/kg, an exceptional value. This cell is also capable of delivering a power density of 5-10 kW/kg, comparable to those of the best symmetric supercapacitors. Furthermore, this value is more than one order of magnitude higher than those of conventional Li-ion cells. This is a very stunning result. The corresponding SMC cell using prelithiated E-MWCNT as an anode active material and an E-MWCNT as the cathode active material stores a significantly lower amount of energy per unit cell weight as compared to the presently invented Li-ion cell. Further, the corresponding cell using prelithiated, but non-expanded MWCNT as an anode active material and a non-expanded MWCNT as the cathode active material stores an even lower energy and delivers a lower power density.

In summary, after extensive and in-depth studies, we have developed a new lithium-ion battery technology based on new electrochemistry:

(1) We have discovered that a broad array of chemically treated or expanded carbonaceous or graphitic materials prepared in a meso-porous structure, can be used as a cathode active material, as opposed to an anode active material, of a lithium-ion cell. It has been commonly and generally accepted that if a material can be used as an anode active material of a lithium-ion cell, the same material cannot be used as a Li-ion cell cathode active material. There has been no reported example of using a common anode active material of a lithium-ion cell as a cathode active material of a lithium-ion cell. We have defied this expectation of all artisans in the field of electrochemistry or battery industry.

(2) We have further observed that the meso-porous carbonaceous or graphitic material cathode in a lithium-ion cell as herein specified can exhibit a specific capacity significantly higher than 1,000 mAh/g and, in several samples, the capacity has exceeded 2,000 mAh/g. This has been most surprising and has not been reported or predicted by those who work in the battery industry or the field of electrochemistry. All the commonly used cathode active materials for lithium-ion cells have a practical specific capacity lower than 250 mAh/g (mostly lower than 200 mAh/g).

(3) Further, when graphene or a meso-porous carbon or graphite material was used as an anode active material of a lithium-ion cell, it suffered huge first-cycle irreversibility and rapid capacity fade as charges/discharges proceeded. For instance, an initial lithium storage capacity of typically 600-1,500 mAh/g was reported, but these anodes lost 50% of its capacity after first cycle or first few cycles, likely due to the formation of solid-electrolyte interface (SEI). This irreversibility could not be prevented if graphene or a meso-porous carbon or graphite material is used as an anode active material and no one had been able to overcome this serious issue. Surprisingly, when the same meso-porous carbon or graphite is used as a cathode active material (instead of an anode active material), the resulting Li-ion cell as herein specified exhibits a nearly 100% first-cycle efficiency and nearly 100% efficiency for thousands of cycles that follow.

(4) The implementation of a meso-porous carbon or graphite cathode in a lithium-ion cell has led to an unprecedentedly high energy density, greater than 400 Wh/kg (based on total cell weight) in several cases. This is absolutely a revolution in lithium-ion battery industry. Also quite shocking is the observation that the meso-porous carbon or graphite cathode-based lithium-ion cell can deliver a power density comparable to or better than those of symmetric supercapacitors that are noted for their superior ability to deliver high power. However, these supercapacitors are only capable of storing an energy density of typically <10 Wh/kg (mostly <6 Wh/kg). In contrast, the presently invented lithium-ion cells have achieved an unprecedented combination of exceptional energy density (highest value ever reported) and exceptional power density (order of magnitude higher than those of state-of-the-art Li-ion batteries).

We claim:

1. A lithium-ion cell comprising:
   (a) A positive electrode (cathode) comprising a carbon or graphitic material selected from graphite worms, exfoliated graphite flakes, expanded graphite, chemically treated graphite with an inter-graphene planar separation no less than 0.4 nm, chemically etched or expanded soft carbon, chemically etched or expanded hard carbon, exfoliated activated carbon, chemically etched or expanded carbon black, chemically expanded multi-walled carbon nano-tube having a diameter from 1 to 100 nm, chemically expanded carbon nano-fiber having a diameter from 1 to 100 nm, or a combination thereof as the only cathode active material having a surface area to capture and store lithium thereon and wherein said cathode forms a meso-porous structure having a pore size in the range from 2 nm to 50 nm and a specific surface area greater than 50 $m^2/g$;
   (b) A negative electrode (anode) comprising an anode active material having a lithium-storing capacity no less than 400 mAh/g, wherein said anode active material consisting of an intercalation compound is mixed with a conductive additive and/or a resin binder to form a porous electrode structure, or coated onto a current collector in a coating or thin film form, and wherein said anode active material is not pre-lithiated and is lithium-free when the cell is made;
   (c) A porous separator disposed between the anode and the cathode;
   (d) A lithium-containing electrolyte in ionic contact with the anode and the cathode; and
   (e) A lithium source disposed in at least one of the two electrodes when the cell is made.

2. The lithium-ion cell of claim 1 wherein said anode active material is silicon, germanium, tin, or tin oxide.

3. The lithium-ion cell of claim 1 wherein said cathode has a specific surface area greater than 100 $m^2/g$.

4. The lithium-ion cell of claim 1 wherein said cathode has a specific surface area greater than 1,000 $m^2/g$.

5. The lithium-ion of claim 1 wherein said cathode further contains a conductive filler selected from graphite or carbon particles, carbon black, expanded graphite particles, carbon nanotube having a diameter from 1 to 100 nm, carbon nano-fiber having a diameter from 1 to 100 nm, carbon fiber, conductive polymer, or a combination thereof.

6. The lithium-ion cell of claim 1 wherein the lithium source comprises a lithium chip, lithium alloy chip, lithium foil, lithium alloy foil, lithium powder, lithium alloy powder, surface stabilized lithium particles, a mixture of lithium metal or lithium alloy with a lithium intercalation compound, lithium or lithium alloy film coated on a surface of an anode or cathode active material, or a combination thereof.

7. The lithium-ion cell of claim 1 wherein said anode active material contains a mixture of a high capacity anode material and a high rate capable anode material, wherein said high rate capable anode material is selected from nano-scaled particles or filaments of a transition metal oxide, $Co_3O_4$, $Mn_3O_4$, $Fe_3O_4$, or a combination thereof, wherein nano-scaled particles or filaments have a diameter or thickness from 0.1 nm to 100 nm, and said high capacity anode material is selected from Si, Ge, Sn, SnO, or a combination thereof.

8. The lithium-ion cell of claim 1, wherein the anode active material is selected from the group consisting of:
   (a) Non-lithiated silicon (Si), germanium (Ge), tin (Sn), and mixtures thereof;
   (b) Non-lithiated alloys or intermetallic compounds of Si, Ge, Sn, and their mixtures;
   (c) Non-lithiated oxides, carbides, nitrides, sulfides, phosphides, selenides, tellurides, or antimonides of Si, Ge, Sn, Sb, Bi, Al, Fe, Ti, Co, Ni, Mn, Cd, and mixtures or composites thereof; and
   (d) Non-lithiated salts or hydroxides of Sn.

9. The lithium-ion cell of claim 1 wherein said anode active material contains a nano material having a thickness or diameter less than 100 nm.

10. The lithium-ion cell of claim 1, wherein the anode active material is a nano particle, nano disc, nano platelete, nano wire, nano-rod, nano belt, nano scroll, nano tube, nano filament, nano coating, or nano film, having a diameter or thickness from 0.1 nm to 100 nm, selected from the group consisting of:
    (a) Non-lithiated silicon (Si), germanium (Ge), tin (Sn), and mixtures thereof;
    (b) Non-lithiated alloys or intermetallic compounds of Si, Ge, Sn, and their mixtures;
    (c) Non-lithiated oxides, carbides, nitrides, sulfides, phosphides, selenides, tellurides, or antimonides of Si, Ge, Sn, Sb, Bi, Al, Fe, Ti, Co, Ni, Mn, Cd, and mixtures or composites thereof; and
    (d) Non-lithiated salts or hydroxides of Sn.

11. A lithium-ion cell comprising:
    (A) A positive electrode (cathode) comprising a carbon or graphitic material selected from graphite worms, exfoliated graphite flakes, expanded graphite, chemically treated graphite with an inter-graphene planar separation no less than 0.4 nm, chemically etched or expanded soft carbon, chemically etched or expanded hard carbon, exfoliated activated carbon, chemically etched or expanded carbon black, chemically expanded multi-walled carbon nano-tube having a diameter from 1 to 100 nm, chemically expanded carbon nano-fiber having a diameter from 1 to 100 nm, or a combination thereof as the only cathode active material having a surface area to capture and store lithium thereon and wherein said cathode forms a meso-porous structure having a pore size in the range from 2 nm to 50 nm and having a specific surface area greater than 50 $m^2/g$;
    (B) A negative electrode (anode) comprising an anode active material for inserting and extracting lithium during a charge and discharge of said cell, wherein the anode active material is a nano particle, nano disc, nano platelet, nano wire, nano-rod, nano belt, nano scroll, nano tube, nano filament, nano coating, or nano film, having a diameter or thickness from 0.1 nm to 100 nm, selected from: (a) a pre-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), or a mixture thereof; (b) a pre-lithiated alloy or intermetallic compound of Si, Ge, Sn, Pb, Sb, Bi, Zn, Al, Ti, Co, Ni, Mn, Cd, or a mixture thereof; (c) a pre-lithiated oxide, carbide, nitride, sulfide, phosphide, selenide, telluride, or antimonide of Si, Ge, Sn, Pb, Sb, Bi; Zn, Al, Fe, Ti, Co, Ni, Mn, Cd, or a mixture or composite thereof, (d) a pre-lithiated salt or hydroxide of Sn; or (e) a pre-lithiated carbon or graphite material, and wherein said anode active material is electrically connected directly to an anode current collector or is connected to an anode current collector through a binder and/or a conductive additive;

(C) A porous separator disposed between the anode and the cathode; and (D) A lithium-containing electrolyte in physical contact with the anode and the cathode.

12. The lithium-ion cell of claim 11 wherein said anode active material contains a mixture of a high capacity anode material and a high rate capable anode material, wherein said high rate capable anode material is selected from nano-scaled particles or filaments, having a diameter or thickness from 0.1 to 100 nm, of a lithium transition metal oxide, lithiated $Co_3O_4$, lithiated $Mn_3O_4$, lithiated $Fe_3O_4$, $Li_4Ti_5O_{12}$, or a combination thereof, and said high capacity anode material is selected from pre-lithiated Si, Ge, Sn, SnO, or a combination thereof.

13. The lithium-ion cell of claim 11, wherein said anode active material is prelithiated to a specific capacity of no less than 500 mAh/g based on the anode active material weight.

14. The lithium-ion cell of claim 11, wherein said anode active material is prelithiated to a specific capacity of no less than 1000 mAh/g based on the anode active material weight.

15. The lithium-ion cell of claim 11, wherein said anode active material is prelithiated to a specific capacity of no less than 2,000 mAh/g based on the anode active material weight.

16. The lithium-ion cell of claim 11, wherein said anode active material is prelithiated to a specific capacity of no less than 3,000 mAh/g based on the anode active material weight.

17. A lithium-ion cell comprising:
(a) A positive electrode (cathode) comprising a carbon or graphitic material selected from graphite worms, exfoliated graphite flakes, expanded graphite, chemically treated graphite with an inter-graphene planar separation no less than 0.4 nm, chemically etched or expanded soft carbon, chemically etched or expanded hard carbon, exfoliated activated carbon, chemically etched or expanded carbon black, chemically expanded multi-walled carbon nano-tube having a diameter from 1 to 100 nm, chemically expanded carbon nano-fiber having a diameter from 1 to 100 nm, or a combination thereof, as the only cathode active material having a surface area to capture and store lithium thereon and wherein said cathode forms a meso-porous structure having a pore in the range of 2 nm to 50 nm and having a specific surface area greater than 50 $m^2/g$;
(b) A negative electrode (anode) comprising an anode active material for inserting and extracting lithium during a charge and discharge of said cell, wherein said anode active material is selected from: (a) a pre-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), or a mixture thereof; (b) a pre-lithiated alloy or intermetallic compound of Si, Ge, Sn, Pb, Sb, Bi, Zn, Al, Ti, Co, Ni, Mn, Cd,or a mixture thereof; (c) a pre-lithiated oxide, carbide, nitride, sulfide, phosphide, selenide, telluride, or antimonide of Si, Ge, Sn, Pb, Sb, Bi, Zn, Al, Fe, Co, Ni, Mn, Cd, or a mixture or composite thereof, or (d) a pre-lithiated salt or hydroxide of Sn; and said anode active material is mixed with a conductive filler and a binder to form a porous electrode;

(c) A porous separator disposed between the anode and the cathode; and (d) A lithium-containing electrolyte in physical contact with the two electrodes.

18. The lithium-ion cell of claim 17, further containing a lithium source disposed in at least one of the two electrodes when the cell is made, wherein said lithium source comprises a lithium chip, lithium alloy chip, lithium foil, lithium alloy foil, lithium powder, lithium alloy powder, surface stabilized lithium particles, a mixture of lithium metal or lithium alloy with a lithium intercalation compound, lithium or lithium alloy film coated on a surface of an anode or cathode active material, or a combination thereof.

19. The lithium-ion cell of claim 1, further comprising an anode current collector and/or cathode current collector that is a porous, electrically conductive material selected from metal foam, metal web or screen, perforated metal sheet, metal fiber mat, metal nanowire mat, porous conductive polymer film, conductive polymer nano-fiber mat or paper, conductive polymer foam, carbon foam, carbon aerogel, carbon xerox gel, graphene foam, graphene oxide foam, reduced graphene oxide foam, carbon fiber paper, graphene paper, graphene oxide paper, reduced graphene oxide paper, carbon nano-fiber paper, carbon nano-tube paper, or a combination thereof, wherein said nanowire, nano-fiber, or nano-tube has a diameter or thickness from 1 to 100 nm.

20. The lithium-ion cell of claim 11, further comprising an anode current collector and/or cathode current collector that is a porous, electrically conductive material selected from metal foam, metal web or screen, perforated metal sheet, metal fiber mat, metal nanowire mat, porous conductive polymer film, conductive polymer nano-fiber mat or paper, conductive polymer foam, carbon foam, carbon aerogel, carbon xerox gel, graphene foam, graphene oxide foam, reduced graphene oxide foam, carbon fiber paper, graphene paper, graphene oxide paper, reduced graphene oxide paper, carbon nano-fiber paper, carbon nano-tube paper, or a combination thereof, wherein said nanowire, nano-fiber, or nano-tube has a diameter or thickness from 1 to 100 nm.

21. The lithium-ion cell of claim 17, further comprising an anode current collector and/or cathode current collector that is a porous, electrically conductive material selected from metal foam, metal web or screen, perforated'metal sheet, metal fiber mat, metal nanowire mat, porous conductive polymer film, conductive polymer nano-fiber mat or paper, conductive polymer foam, carbon foam, carbon aerogel, carbon xerox gel, graphene foam, graphene oxide foam, reduced graphene oxide foam, carbon fiber paper, graphene paper, graphene oxide paper, reduced graphene oxide paper, carbon nano-fiber paper, carbon nano-tube paper, or a combination thereof, wherein said nanowire, nano-fiber, or nano-tube has a diameter or thickness from 1 to 100 nm.

22. The lithium-ion cell of claim 1, wherein the electrolyte is organic liquid electrolyte, ionic liquid electrolyte, gel electrolyte, polymer electrolyte, or solid electrolyte containing a first amount of lithium ions when said cell is made.

23. The lithium-ion cell of claim 11, wherein the electrolyte is organic liquid electrolyte, ionic liquid electrolyte, gel electrolyte, polymer electrolyte, or solid electrolyte containing a first amount of lithium ions when said cell is made.

24. The lithium-ion cell of claim 17, wherein the electrolyte is organic liquid electrolyte, ionic liquid electrolyte, gel electrolyte, polymer electrolyte, or solid electrolyte containing a first amount of lithium ions when said cell is made.

25. The lithium-ion cell of claim 1, wherein said anode, said cathode, or both contains less than 1% by weight oxygen.

* * * * *